(12) United States Patent
Denk et al.

(10) Patent No.: US 6,471,197 B1
(45) Date of Patent: Oct. 29, 2002

(54) SPRING DEVICE FOR SHOCK ABSORBER WITH ADJUSTER

(75) Inventors: Peter Denk, Freiburg; Wolfgang Ebersbach, Gundelfingen, both of (DE)

(73) Assignee: Denk Engineering GmbH, Freiburg (DE)

( * ) Notice: Subject to any disclaimer, the term of this patent is extended or adjusted under 35 U.S.C. 154(b) by 0 days.

(21) Appl. No.: 09/507,870

(22) Filed: Feb. 22, 2000

(30) Foreign Application Priority Data

Apr. 9, 1999 (DE) .......................................... 199 16 017

(51) Int. Cl.⁷ ................................................. F16F 1/12
(52) U.S. Cl. ...................... 267/175; 207/177; 207/179
(58) Field of Search ................. 257/177, 175, 257/179

(56) References Cited

U.S. PATENT DOCUMENTS

| | | | | |
|---|---|---|---|---|
| 3,163,195 A | * | 12/1964 | Croswell | 267/177 |
| 3,169,757 A | * | 2/1965 | Roder et al. | 267/177 |
| 3,779,537 A | * | 12/1973 | Kalister | 267/179 |
| 5,000,222 A | * | 3/1991 | Moenkhaus et al. | 267/177 |
| 5,803,443 A | | 9/1998 | Chang | |

FOREIGN PATENT DOCUMENTS

| | | |
|---|---|---|
| DE | 473061 | 9/1929 |
| DE | 50165 | 10/1966 |
| DE | 3609391 | 9/1987 |
| DE | 3609437 | 9/1987 |
| GB | 1333555 | 10/1973 |
| JP | 55145831 | 11/1980 |
| JP | 6-33967 | 2/1994 |
| JP | 6-58355 | 3/1994 |

OTHER PUBLICATIONS

Vallory H. Laughner and Augustus D. Hargan, "Supplement 39 Spring–Actuated Detent Mechanisms for Latching and Indexing–Part 1", *Handbook of Fastening and Joining of Metal Parts*, 1956, p. 508.

Heinrich Mauri, "Werkstattbücher", *Der Vorrichtungsbau*, 1968, pp. 14–17.

\* cited by examiner

Primary Examiner—Matthew C. Graham
(74) Attorney, Agent, or Firm—Pearne & Gordon LLP

(57) ABSTRACT

The invention relates to a spring device in a shock absorber having an adjusting mechanism (18; 52).

19 Claims, 21 Drawing Sheets

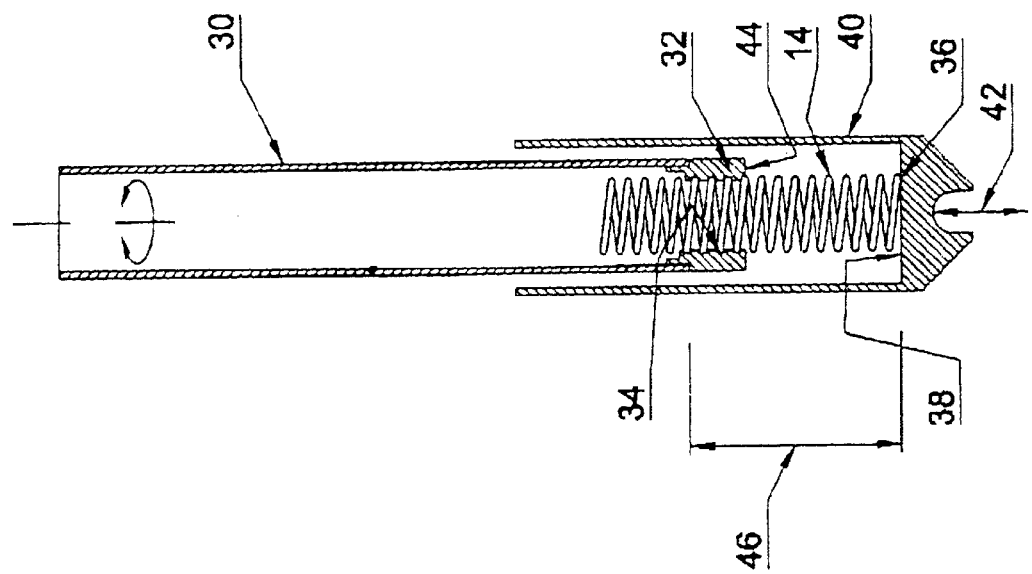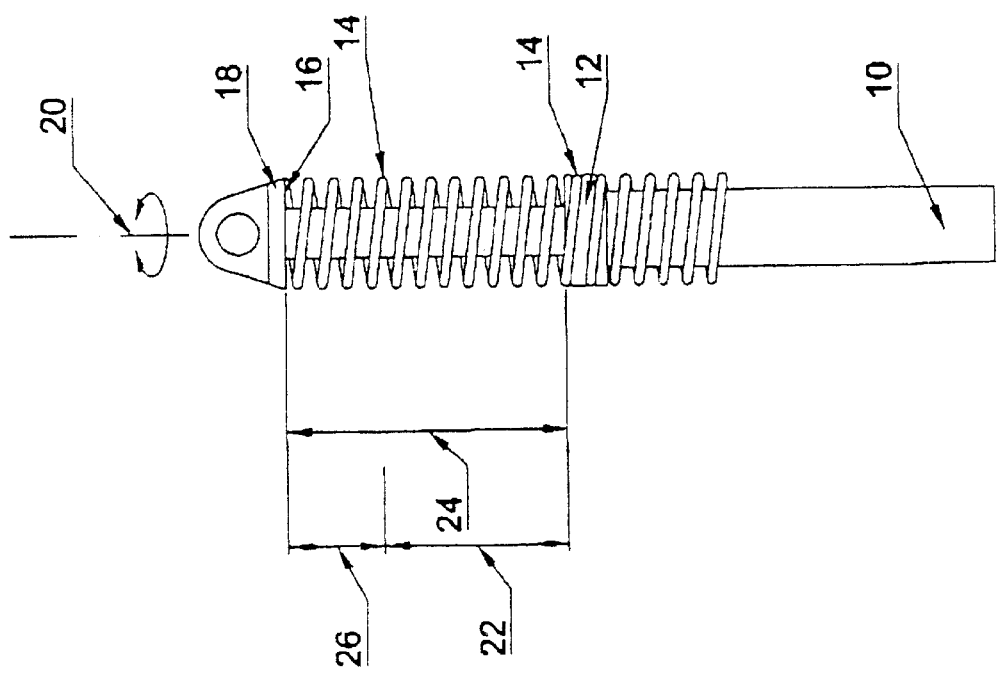

Figure 3:
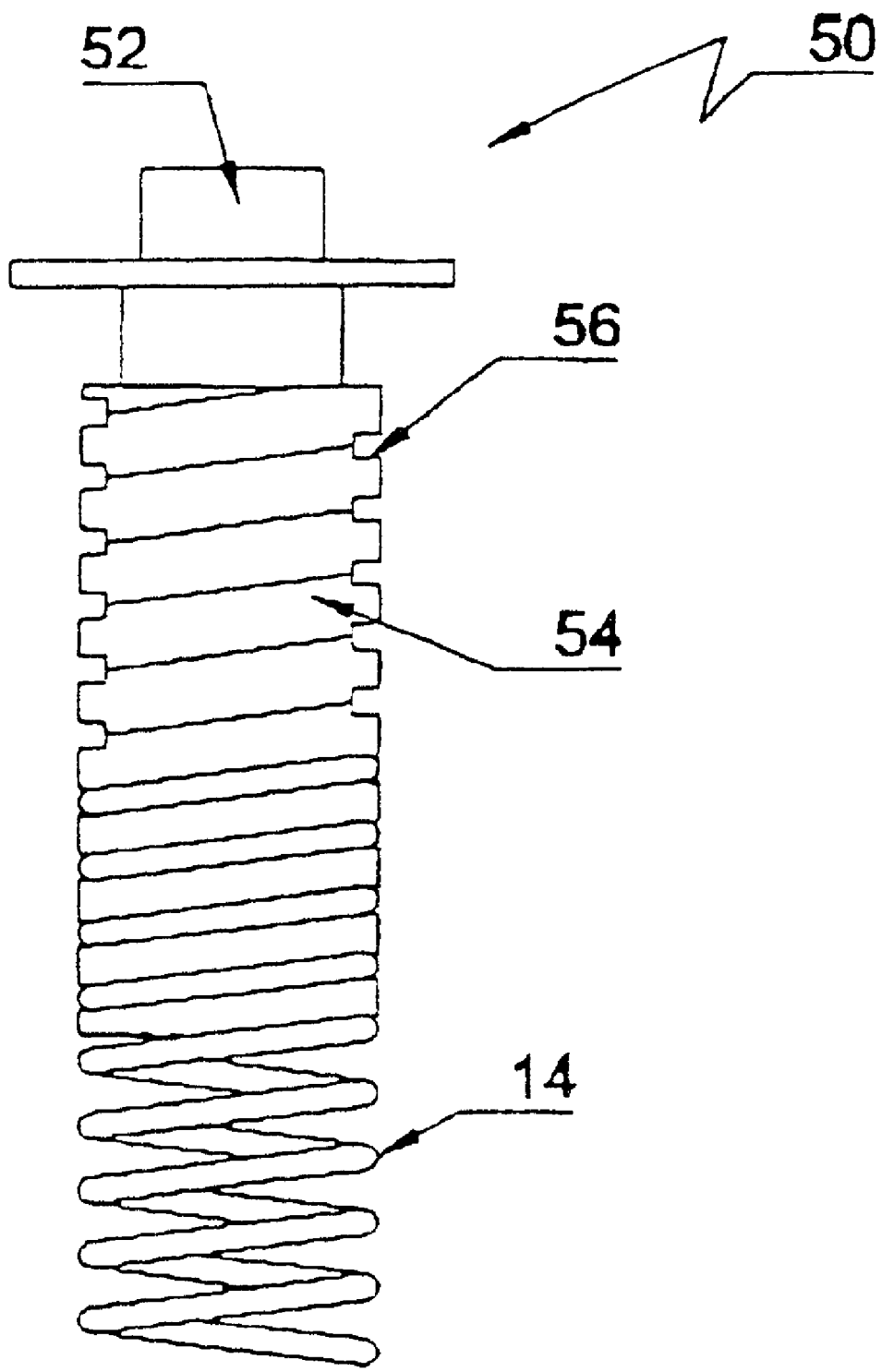

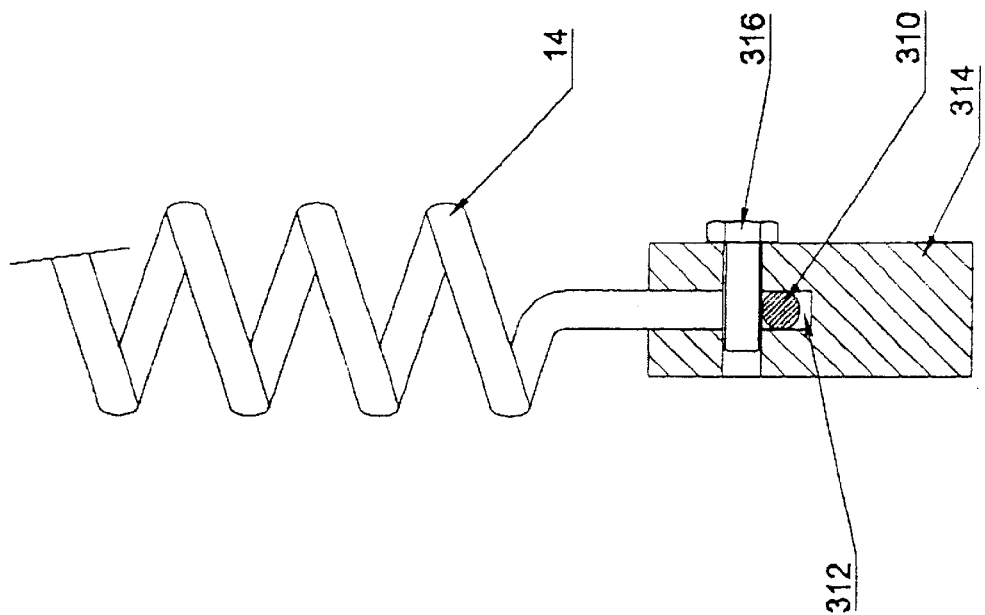
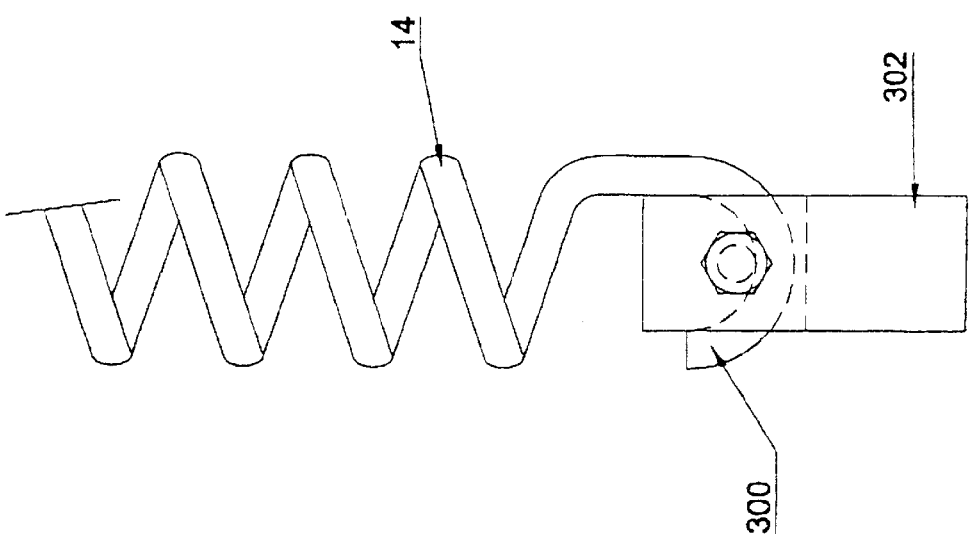

SPRING DEVICE FOR SHOCK ABSORBER WITH ADJUSTER

The invention relates to a spring device, particularly to a spring device having a coil spring comprising an adjusting facility, as well as to an application of a spring device having an adjusting facility for the spring suspension of a vehicle, especially for the spring suspension of a motor vehicle or a bicycle.

Spring devices are employed, for example, in vehicles such as bicycles or motor vehicles, or in machines, particularly in order to improve their dynamic characteristics or to adapt them to dynamics, respectively. In so doing, various components are connected by means of spring elements for an at least partial mechanical isolation. In addition, absorber elements may be provided which influence the dynamic behavior of the overall system, and in particular prevent the overall system from over vibration.

Spring devices are employed, for example, in order to mechanically isolate the wheels of vehicles relative to the vehicle body. Spring devices are used, for example, for the wheel suspension of motor vehicles. Spring elements are also used—often in combination with absorber elements—in the wheel suspension of two-wheeled vehicles, especially bicycles. Spring elements are thus disposed in so-called spring forks.

For example, spring devices are disposed inside each fork cross bar which work in concert with an elastomer shock absorber. The fork cross bar is thus mechanically isolated from the stem tube by means of this spring absorbing arrangement.

Without limitation to the invention, the invention will now be described in greater detail in the following, in particular with respect to the example of a bicycle Wheel suspension, whereby it should be noted that a spring device according to the invention is likewise preferable in various other possible applications, for example in machines such as machine tools, in motor vehicle wheel suspensions and other similar contrivances.

In accordance with the present invention, a spring device is proposed having a spring, a load transmission means, as well as an adjusting means at least partially encompassed by said load transmission means, said adjusting means being provided for adjusting the position of at least one load transmission section.

The spring is disposed with load transmission sections which are encompassed by the spring surface, and within which external forces may be introduced in at least two positions respectively from at least one embracing member, said embracing members preferably being mechanically isolated by means of the spring.

Reference to load transmission sections must be hereby particularly understood as areas of the spring surface. Thus, the load transmission sections may be, dependent upon predetermined conditions, disposed at various positions on the spring surface, or at various spring surface areas, respectively. The external forces in each case are thus introduced in particular by at least one embracing member.

The term "embracing member" is hereby to be understood in a broad sense. An embracing member in this case is especially a component coupled with the spring device, said component in contact with the spring device such that forces applied to the spring device by said embracing member are at least partially isolated. For example, an embracing member may be understood as a cap placed on the spring, or an absorber device adjoined to the spring, or a fork cross bar of a bicycle, or a stem tube, or any such component being in each case solidly affixed thereto.

The external forces which are introduced may be of the most diverse kinds. For example, in a corresponding application of a spring device according to the present invention, which, for example, is mounted in a fork cross bar or in a stem tube of a bicycle, or which is mounted in a corresponding manner on a bicycle rear wheel for the purpose of its suspension and which receives said induced forces from the wheel via the rider and/or from the rider alone on the one hand and, on the other hand, also those forces thereby coupled with the spring which are introduced thereupon from the ground via the bicycle wheel. Thereby, the spring device may at least partially isolate dynamic loads, in particular such as those induced by, for example, changing ground surface conditions such as rocks, curbs, pot holes and other similar environmental conditions, so that they are not transmitted on to the rider.

The adjusting means is configured such that, for example, one of the spring ends is solidly mounted in a cap-like element such as a rotating knob, whereby the cap with the spring is rotatably mounted about the spring axis. At a second position, the spring is positioned with its coils in a thread, which is disposed, for example, on the casing of an absorber cover or the like. A turning of the rotating knob induces the coils of the spring to rotate helically in the thread, the thread of the absorber cover for example, so that the thread displaces relative to the spring. Hereby, the distance between the spring end disposed with the rotating knob and the section of the spring coils presently lodged in said thread, changes, so that the spring—without being additionally stressed or relaxed—changes its effective length, hence, the length between two points of contact changes. Hereby, an embracing member, which is solidly connected to the thread, is mechanically isolated from an embracing member which is solidly coupled—at least in the spring axis direction—to the cap.

According to another exemplary embodiment of the invention, a rotatably mounted bicycle seat tube has a female thread disposed in its lower section or, respectively, is solidly connected with a component such as a sleeve having a female thread. Said female thread is capable of receiving a coil spring, so that the coil spring forms a screwed-type of connection with the female thread. The coil spring is supported at one end against a fork cross bar which is mounted axially displaceable relative to the seat tube, or against another component being solidly connected thereto. Preferably, a rotary lock which is disposed between said fork cross bar and spring, or which is formed by said components respectively, prevents the end section of the spring from rotating relative to the fork cross bar. A rotation of the seat tube causes the spring, which represents a type of male thread, to move within the female thread of the seat tube so that the effective spring length changes, meaning a change is effected in the length between the coil section of the spring which is received in the female thread of the seat tube and the point of support of the spring on the fork cross bar. In this way, the effective spring length may be changed without thereby changing the initial spring tension in the effective spring length section.

According to another preferred embodiment of the present invention, which likewise may be employed for example on a bicycle, a setting knob is connected with a type of shaft having a male thread.

It is further preferred that instead of a shaft having a male thread, a type of tube comprising a female thread is provided. A combination of these two possibilities is equally preferred as well.

Said thread or said threads engage/s in the coils of the spring so that the spring forms a type of counter-thread. The spring end distal the rotating knob is supported on an embracing member such as, for example, a fork cross bar and is preferably secured at this position against rotation relative the embracing part. For example, the rotating knob including shaft, hollow shaft respectively, is inserted into the fork cross bar. Upon turning of the rotating knob, said knob including shaft retracts relative to the fork cross bar or, respectively, draws nearer thereto. Thereby, the thread connected with the setting knob screws further into the spring or, respectively, rotates out therefrom. The free end of the spring supported against the embracing part, such as the fork cross bar, elongates so that the effective spring length changes. Since the fork cross bar is disposed axially displaceable relative to the setting knob, a change of spring tension in the section of the respective effective spring length as conditional upon an adjustment operation is avoided.

In accordance with a particularly preferred embodiment of the present invention, elements are solidly coupled with the spring coils over at least one part of the spring axis. Said elements may be brought into contact with a receiving means of the embracing part. Upon a relative displacement of the embracing part with respect to the spring, other elements, or elements which are situated at another location in spring axial direction, are brought to said receiving means and may be hooked or similarly fastened thereupon.

The invention is particularly advantageous insofar as it enables an adjustment of the characteristic curve of the spring—in particular, an infinitely variable adjustment—without thereby changing the adjustment of the spring initial tension.

According to a particularly preferred embodiment of the invention, the adjusting means which, for example is designed as a rotating knob disposed with a tube shaft having a female thread, or as a rotating knob disposed with a tube shaft having a male thread, is capable of adjusting the spacing of the load transmission sections on the spring while the spring tension remains constant.

According to a particularly preferred embodiment of the present invention, the spring is configured as a coil spring.

According to a further preferred embodiment of the invention, the load transmission means and/or the adjusting means extend/s at least partially into the inner section of the coils or, respectively, into the area which the coils span. Since the coils are helically formed, they define a kind of tubular region.

It should be noted that the term "tubular region" must be understood in a broad sense. For example, the present invention also encompasses coils defining a kind of truncated conical region.

It is preferred that the load transmission means and/or the adjusting means extend/s at least partially into the inner section of said tubular region, whereby sections of the load transmission means, adjusting means respectively, extend to the spring, said sections engaging into the spring. It is further preferred that sections extend from the spring to the load transmission, adjusting means respectively, which engage into said load transmission means or adjusting means, respectively. The position at which the load transmission means, adjusting means respectively, couples with the coils of the spring, is preferably adjustable in the axial direction of the spring.

It is further preferred that the load transmission means, adjusting means respectively, externally enclose the coils, tubular region respectively, whereby sections of the load transmission means or the adjusting means, respectively, extend inwardly to the coils, said sections being coupled with the coils. Also here, the inverse is such preferred that sections extend from the coils to the load transmission means, adjusting means respectively, and which are then coupled at this point to said load transmission means or adjusting means, respectively. Here also, it is preferred that the position said coupling areas is adjustable in the axial direction of the spring.

According to a particularly preferred embodiment of the present invention, the coupling areas are configured such that a solid, immovable connection is or may be established between the load transmission means, adjusting means respectively, and the spring in the coupling region.

It is further preferred that the connection in the coupling area is one having play or one which has at least a degree of flexibility, whereby a relative movement between the spring and the adjusting means, load transmission means respectively, is hindered by means of an additional locking mechanism. Said locking mechanism, for example, is configured such that the spring is screwed around a load transmission means which, for example, is of helical shape, and a degree of flexibility fundamentally exists in the direction of the thread pitch. A relative movement may be prevented, for example, by locking the helical component, hence the load transmission means, at another position, for example by means of a catching detent mechanism. Thus, the screw is not capable of exerting a relative rotation with respect to the spring. A relative axial movement between the screw and the spring is prevented by the spring's engagement into the screw's thread.

It is further preferred that the screw-type connection is of a self-locking configuration.

According to a preferred embodiment of the present invention, the area the load transmission or adjusting means extending radially outwardly and/or radially inwardly of the spring coils, engages in at least one coil interspace. Upon a force being applied to the spring from this engaging area and/or a second area disposed, for example, on the other spring end, the spring is braced with its coils against said force in said area engaging the coils, so that an isolating of the embracing parts is effected.

It is further preferred that the afore-mentioned area engages in various coil interspaces. It is particularly preferred that it engages in adjacent coil interspaces in axial direction, whereby said engaging area comprises a connective region in the form of a recess which embraces said engaged coil. This is realized, for example, in that a thread is screwed into the spring coils.

A thread of this kind connected with the load transmission means, adjusting means respectively, is preferably so dimensioned and disposed relative to the spring such that, depending upon the adjustment position, the length of the thread engaging in the spring varies.

In accordance with a particularly preferred embodiment of the present invention, the length of the thread engaging in the spring is always constant, whereby solely its displacement in axial direction relative to the spring occurs during a change in adjustment.

According to a particularly preferred embodiment of the present invention, at least one part of the adjusting means and/or the load transmission means moves at least occasionally along a three-dimensional path during adjustment. This is realized, for example, in that the load transmission means comprises a thread which engages in the spring and then displaces relative to the spring upon adjustment or change of the adjustment. The external areas of the thread thereby run on a spiral-shaped, hence three-dimensional course.

It is further preferred that at least one part of the adjusting means and/or the load transmission means moves at least occasionally along a two-dimensional, e.g. linear, path during adjustment. This is realized, for example, in that a component is provided which is displaceable in the spring axial direction, such as a kind of bar comprising tongues or similar components, which are capable of being displaced in a radial direction from the bar towards the threads or thread interspaces, respectively. In operation, said tongues or similar components engage in the interspaces, around the screw pitches, respectively. In order to change adjustment, a mechanism moves them out of their engaging position in the direction of the bar. Subsequently, the bar is displaced in axial direction until the desired position is reached. Then the tongues or similar components are moved back into their engaging position. The establishing and releasing of the engaging position may be realized in such a manner that, for example, the tongues or the like are spring-loaded and are then urged into engaging position by means of the spring action. Via a cable mechanism, a rod mechanism, or the like, they may be activated—for example, by pulling on the cable—out of the engaging position relative to the spring tension. Subsequent to relieving the force on the cable or rod, they snap back into their engaging position.

According to a particularly preferred embodiment of the present invention, the spring device comprises a locking means for fixing a predetermined relative position between the load transmission means, the adjusting means respectively, and the spring. As mentioned above, this is realized, for example, in that the load transmission means, adjusting means respectively, comprises a thread for engaging in the screw, whereby the locking may be established in that a rotation of the load transmission means, adjusting means respectively, may be blocked—for example, via a spring-loaded snap-lock mechanism.

According to a particularly preferred embodiment of the present invention, the spring device comprises a compensating mechanism or, respectively, the spring device or the load transmission means or the adjusting means is coupled with a compensating mechanism. The load transmission means, for example, is configured as a helically-shaped element as already described above. Thus, during adjustment, the load transmission, adjusting means respectively, moves in axial direction relative to the spring so that the spacing between the distal end of the load transmission means from the spring, and that between the distal spring end from the load transmission means, changes. At these positions, for example, force is received by further embracing components. Therefore, it may be desirable that the spacing between these points remains constant also during adjustment of the spring. To this purpose, the load transmission means is provided with, for example, a second thread, which engages in the thread of a sleeve. Said sleeve is fixed. Provided that the spacing between the two aforementioned ends of the spring, load transmission means respectively, now changes, the load transmission means simultaneously displaces relative to the sleeve. If, for example, the spacing between the above-mentioned points is shortened, then the spacing between the sleeve distal end from the spring and the distal end of the load transmission means from the sleeve will simultaneously lengthen. Said two dimensions are preferably identical so that the spacing between the sleeve distal end from the spring and the distal spring end from the sleeve remains constant.

According to a particularly preferred embodiment of the present invention, a compensating mechanism of this kind is not provided.

This is preferred when, for example, in addition to a change of the characteristic curve line, also a change of spacing in the load transmission region is desired as well. Thus, for example, it may be desired that during an uphill bicycle ride, a spring deflection of 60 mm at a steep angle of lock and a tighter calibrated spring is desired, whereas during a downhill ride, a spring deflection of 120 mm at a flat angle of lock and at slacker calibration is desired.

Another example for a spring device where besides a change of the characteristic curve line, a change in the afore-mentioned clearance spacings is also desired, is represented by an infinitely variable seat height adjuster for a motorcycle Hereby, it may be desired that while riding off-road, or riding over any kind of uneven ground, a high seat height with slacker suspension is desired, whereas while riding over even ground or in sporting events, a low seat height with tighter spring calibration is desired.

Another illustration of an example in which besides a changed characteristic curve line, a changed clearance spacing is also desired, is represented by an automobile's infinitely variable level control. When driving over city streets, for example, having a high ground clearance and a comfortable calibration may be desired. On the highway, however, a lower ground clearance at tighter spring calibration may be desired.

The combination of spring calibration and clearance spacing is also advantageous for optimizing a chassis and for regulating the center of gravity in racing situations.

These various different combinations of height adjustment and change in characteristic curve may be realized by the use of a spring device according to the present invention.

According to a particularly preferred embodiment of the present invention, the spring device is coupled with an absorber device or, respectively, the spring device comprises an absorber device or, respectively, the spring device is configured in combination with an absorber device. The absorber device may be, for example, a component of the load transmission means and/or the adjusting means.

It is preferred that the absorber device is gang-switched in parallel with the spring device. It is particularly preferred that the spring device is in series connection with the absorber device.

According to a particularly preferred embodiment of the present invention, various load transmission sections are adjustable on the spring, in the manner of adjustment as described above. It is preferred that, for example, two load transmission sections are provided on a spring, with the spring having a different spring constant along its axis. For example, two springs of different rigidity are each interconnected at one each of their respective ends, whereby a load transmission means with an adjusting means engages in each of said springs respectively. Thus, the two load transmission sections may be adjusted independently from one another. Hereby, it can be additionally beneficial to utilize springs having different rigidity. For example, this enables attaining a change in the load transmission section and the spring rigidity while the clearance spacing remaining constant.

Preferably, a spring device in accordance with the present invention is utilized for the suspension of a vehicle such as a motor vehicle or a bicycle or a motorcycle, etc. The application of a spring device in accordance with the present invention is also preferred in (industrial) machines such as machine tools.

It should be pointed out that the interaction of the various characteristics according to the present invention is preferred in any combination desired. In particular, combinations of characteristics as disclosed by the independent claims are preferred in any and all cases, even should one or more characteristics be omitted. A combination of procedures according to the present invention is also preferred.

It should be noted that upon linking of characteristics with "or," in each case said "or" is to be understood as a mathematical "or" on the one hand, and as an "or" excluding the respective other possibility on the other hand.

Further, reference should be made to the fact that the term "control," in the sense of the invention, as well as all terms derived therefrom, must be understood in a broad sense. In particular, it encompasses a regulating and/or control corresponding to the German Industrial Standards (DIN).

It is obvious to the expert skilled in the art that in addition to the embodiment herein described, the invention comprises a plurality of further conceivable modifications and realizations. Particularly, the invention is not limited to the embodiments described herein.

Figure 4:
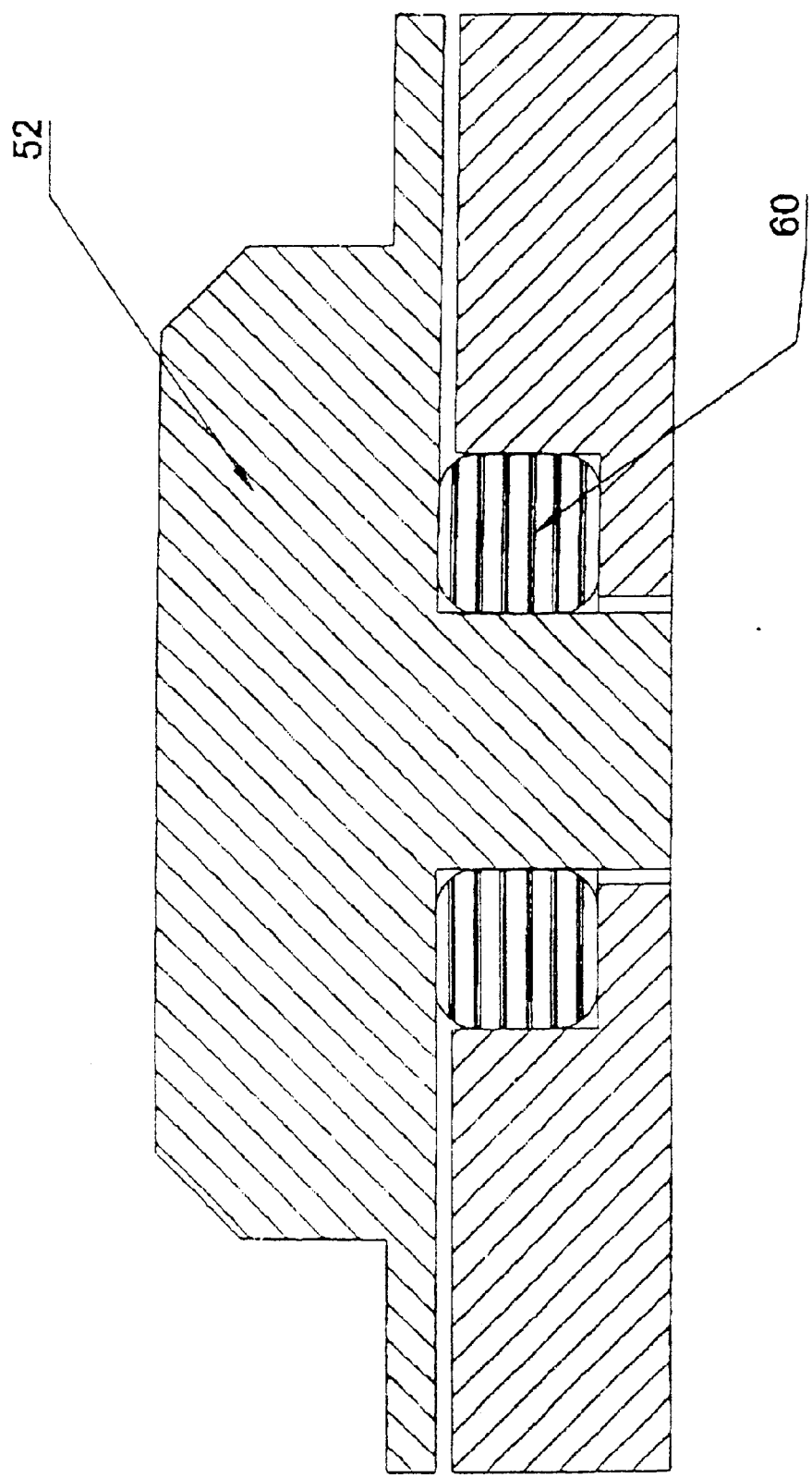
Figure 5:
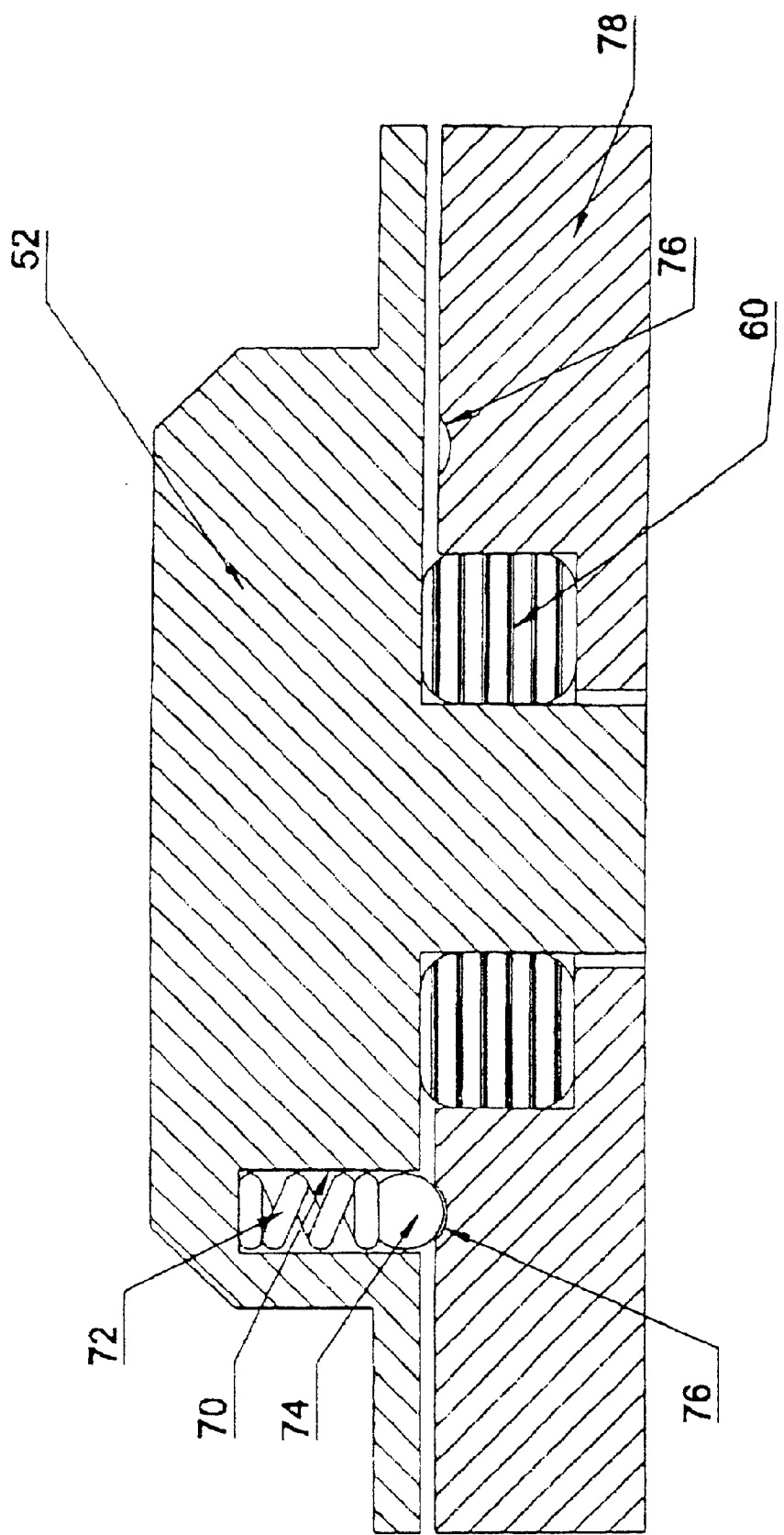
Figure 6:
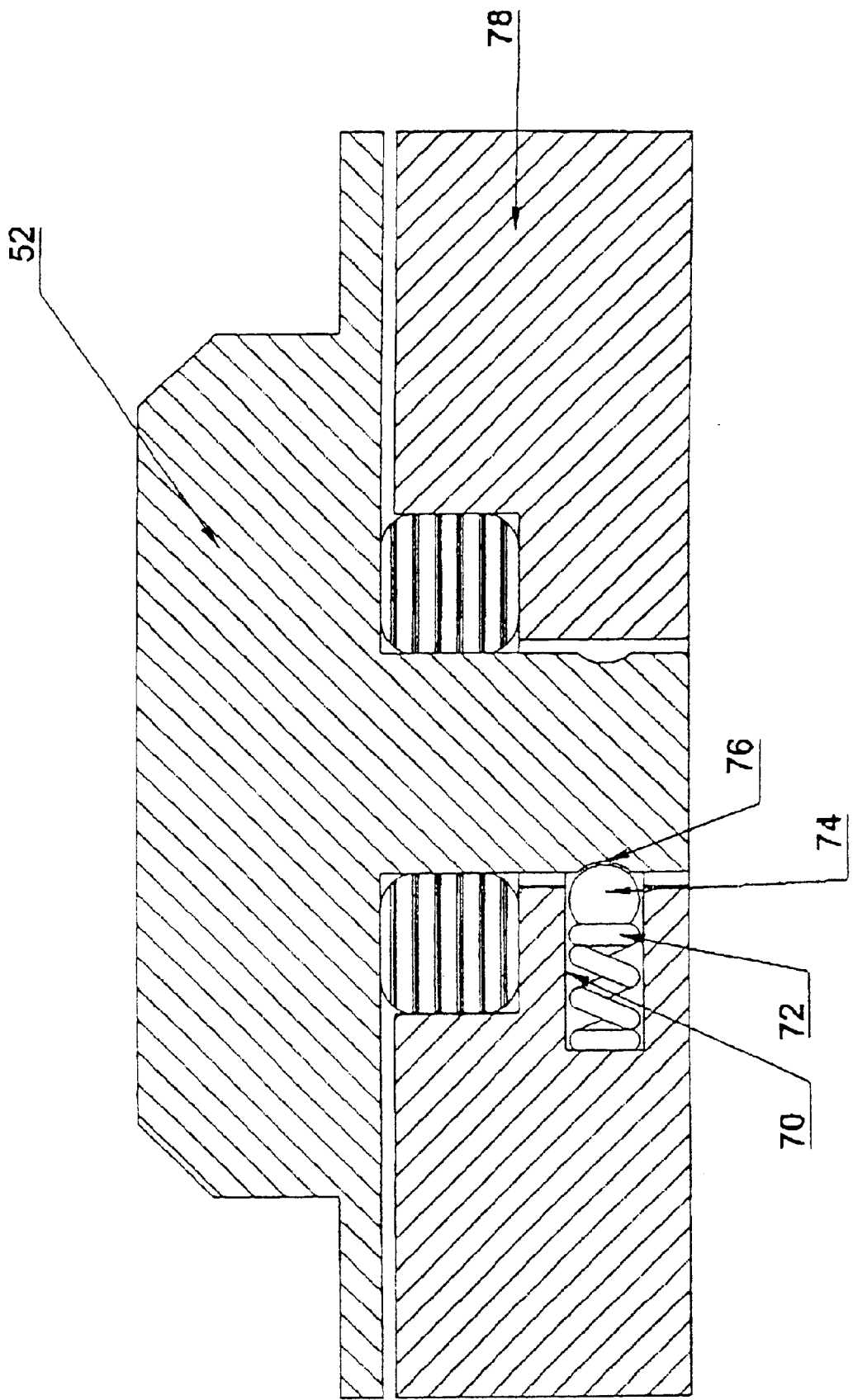
Figure 8A:
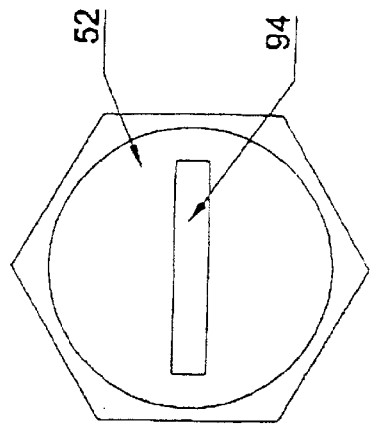
Figure 8B:
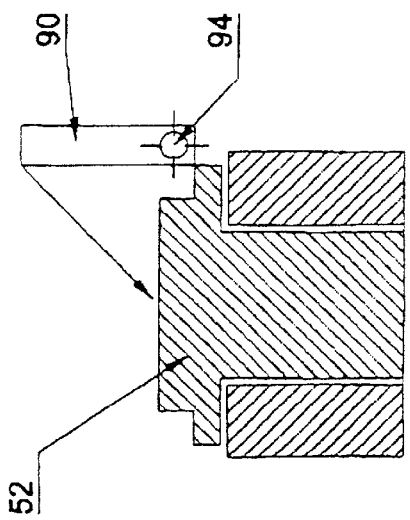
Figure 7A:
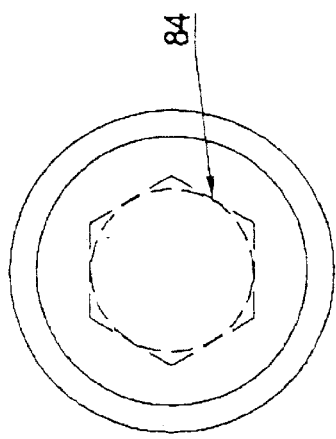
Figure 7B:
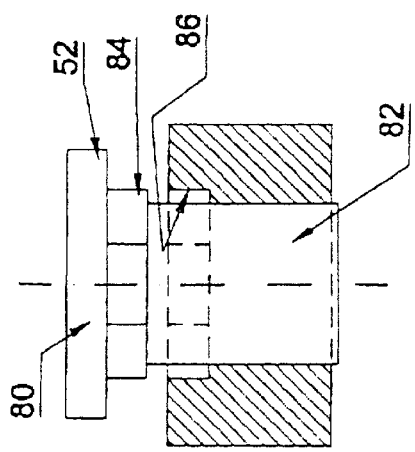
Figure 9A:
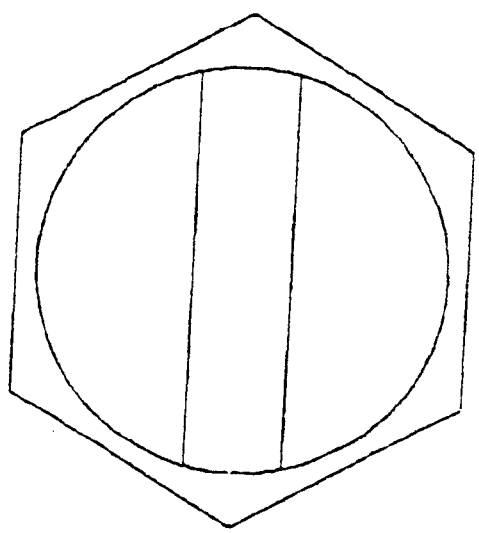
Figure 9B:
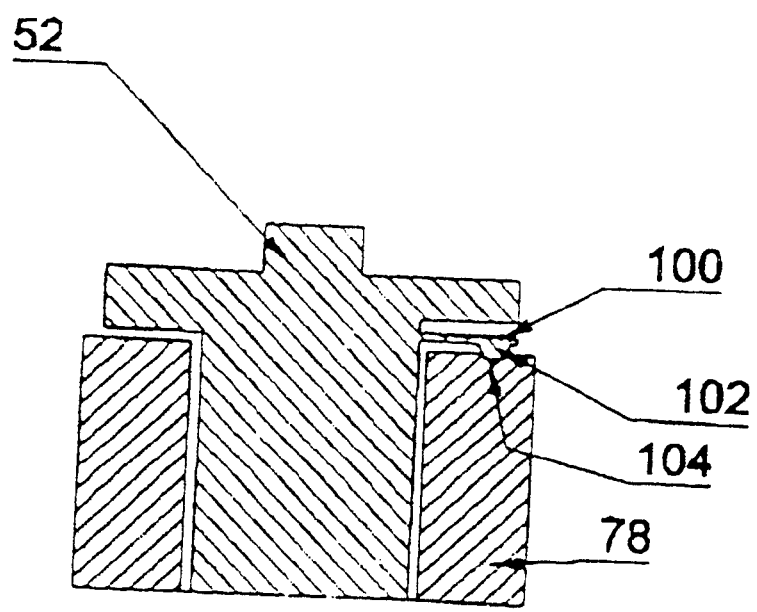
Figure 10A:
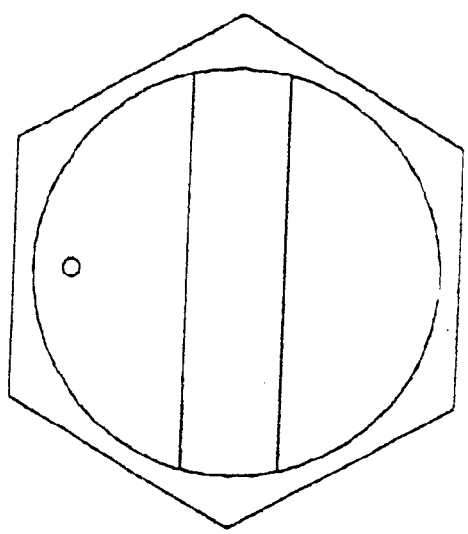
Figure 10B:
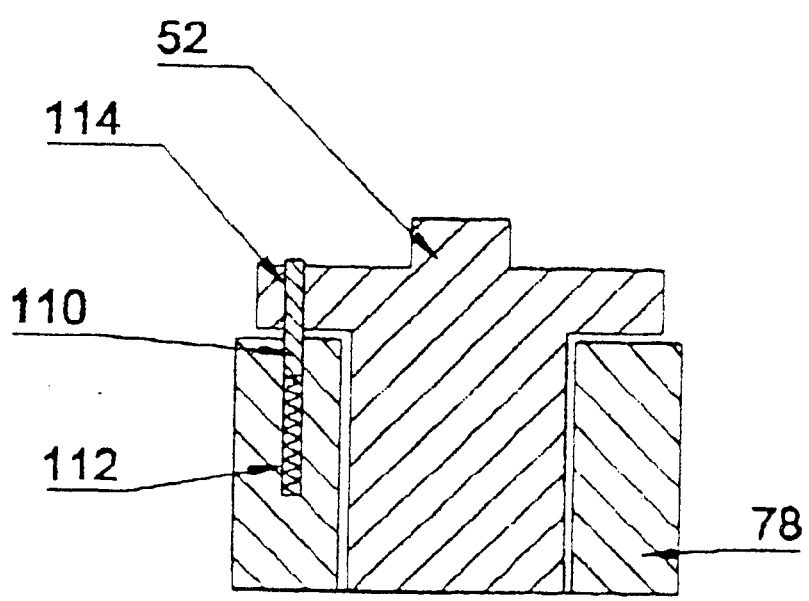
Figure 11:
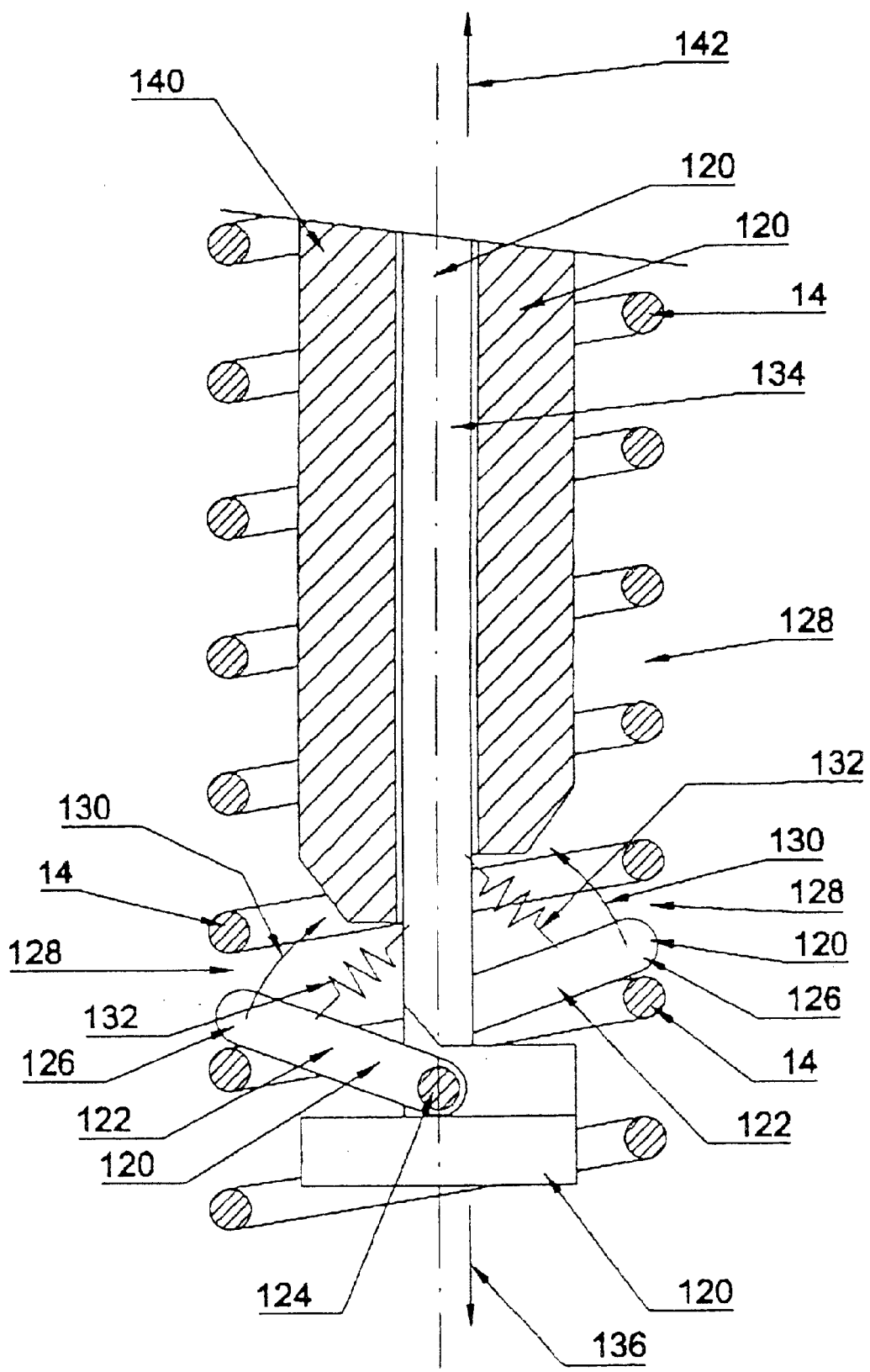
Figure 12:
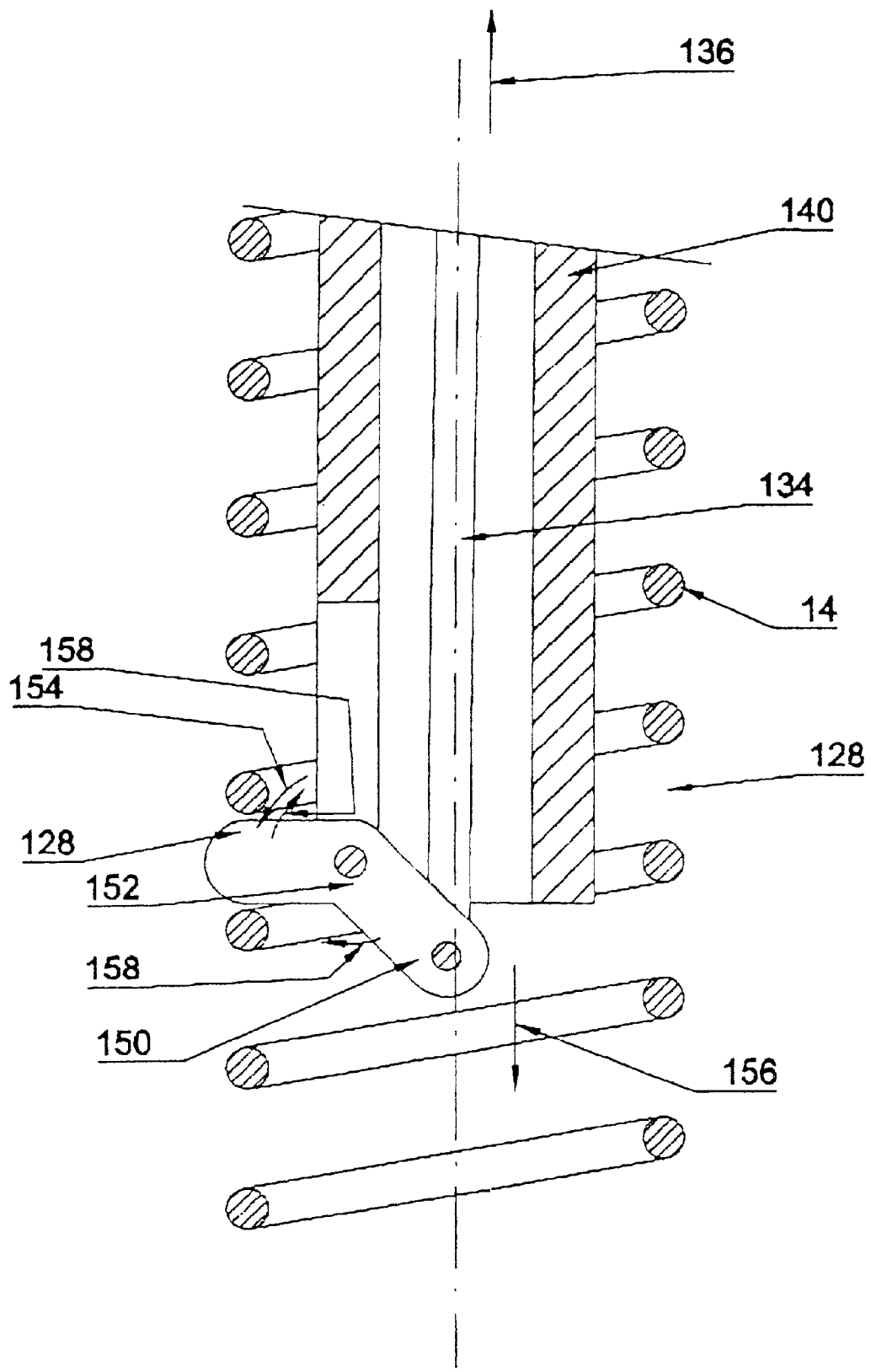
Figure 13A:
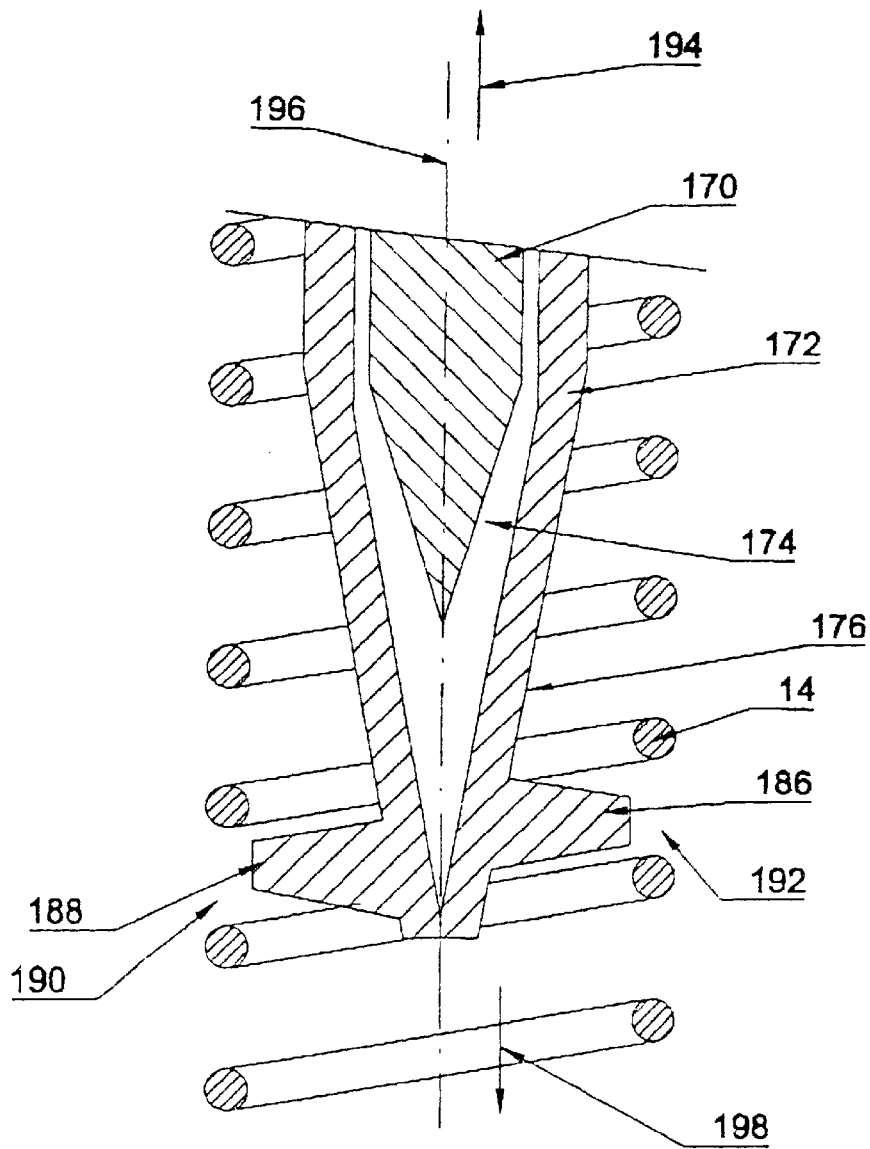
Figure 13B:
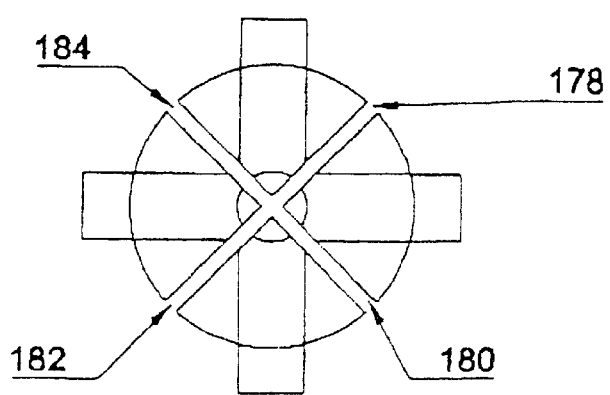
Figure 14A:
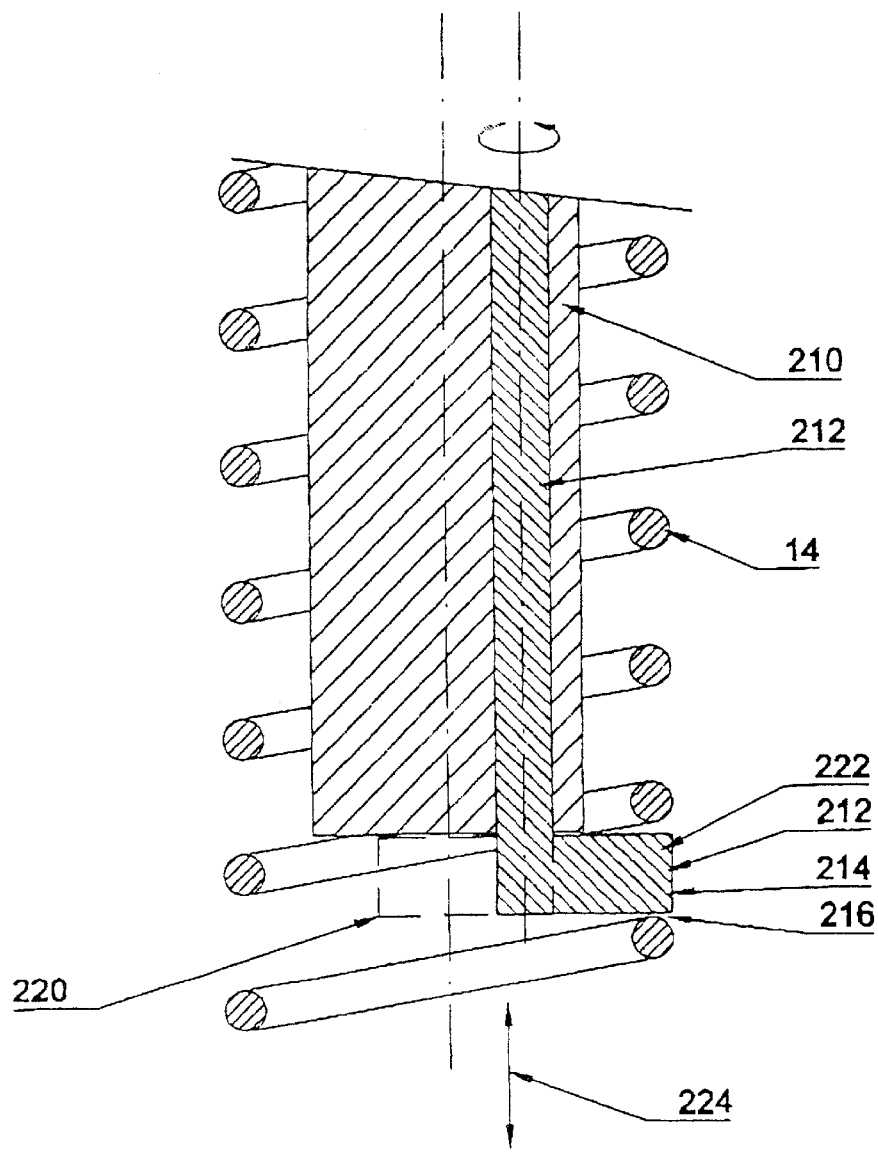
Figure 14B:
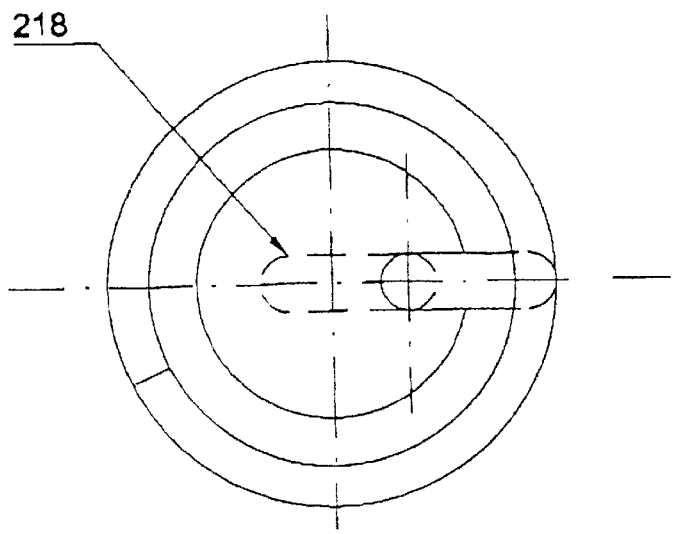
Figure 15:
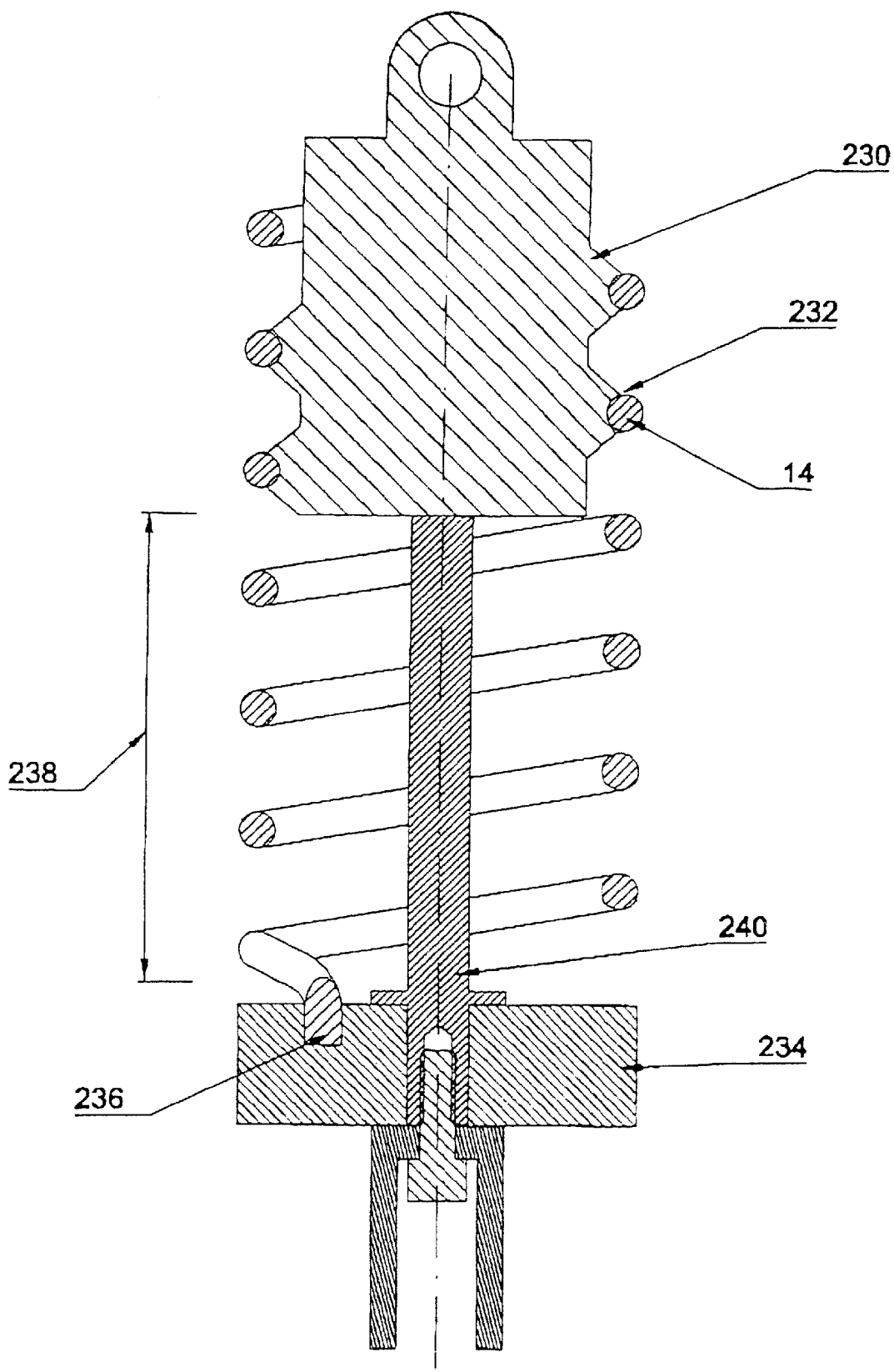
Figure 16:
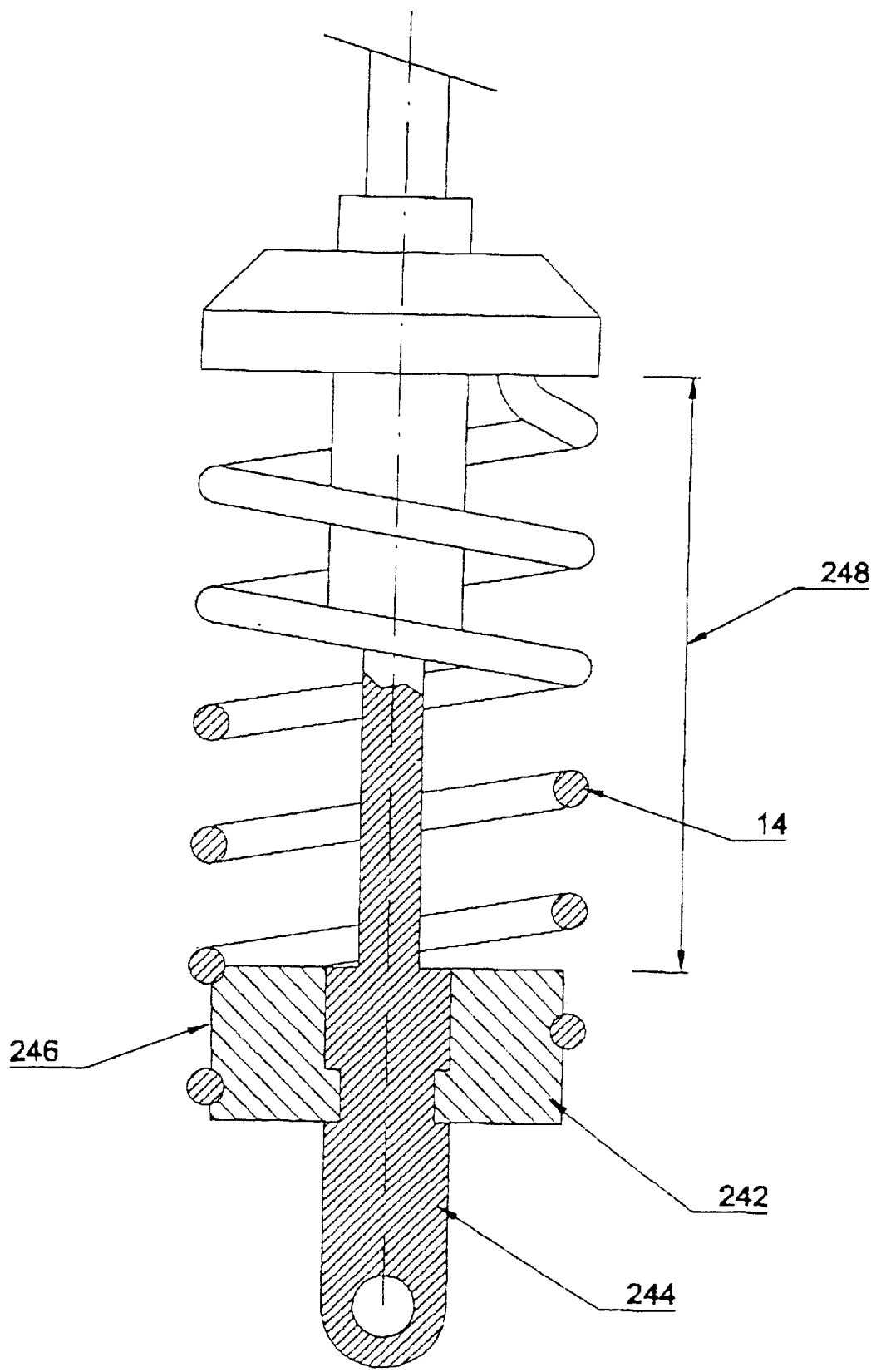
Figure 17:
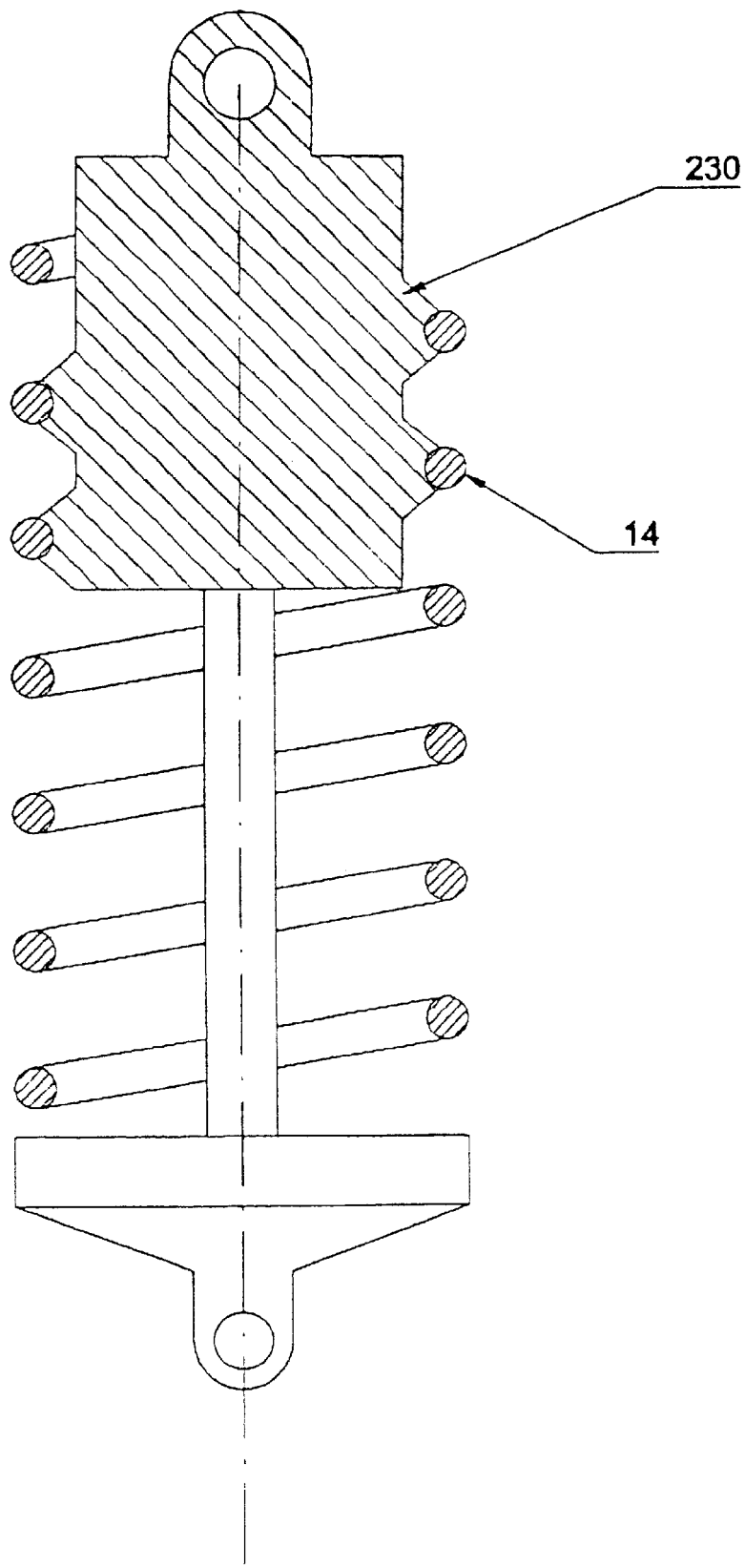
Figure 18:
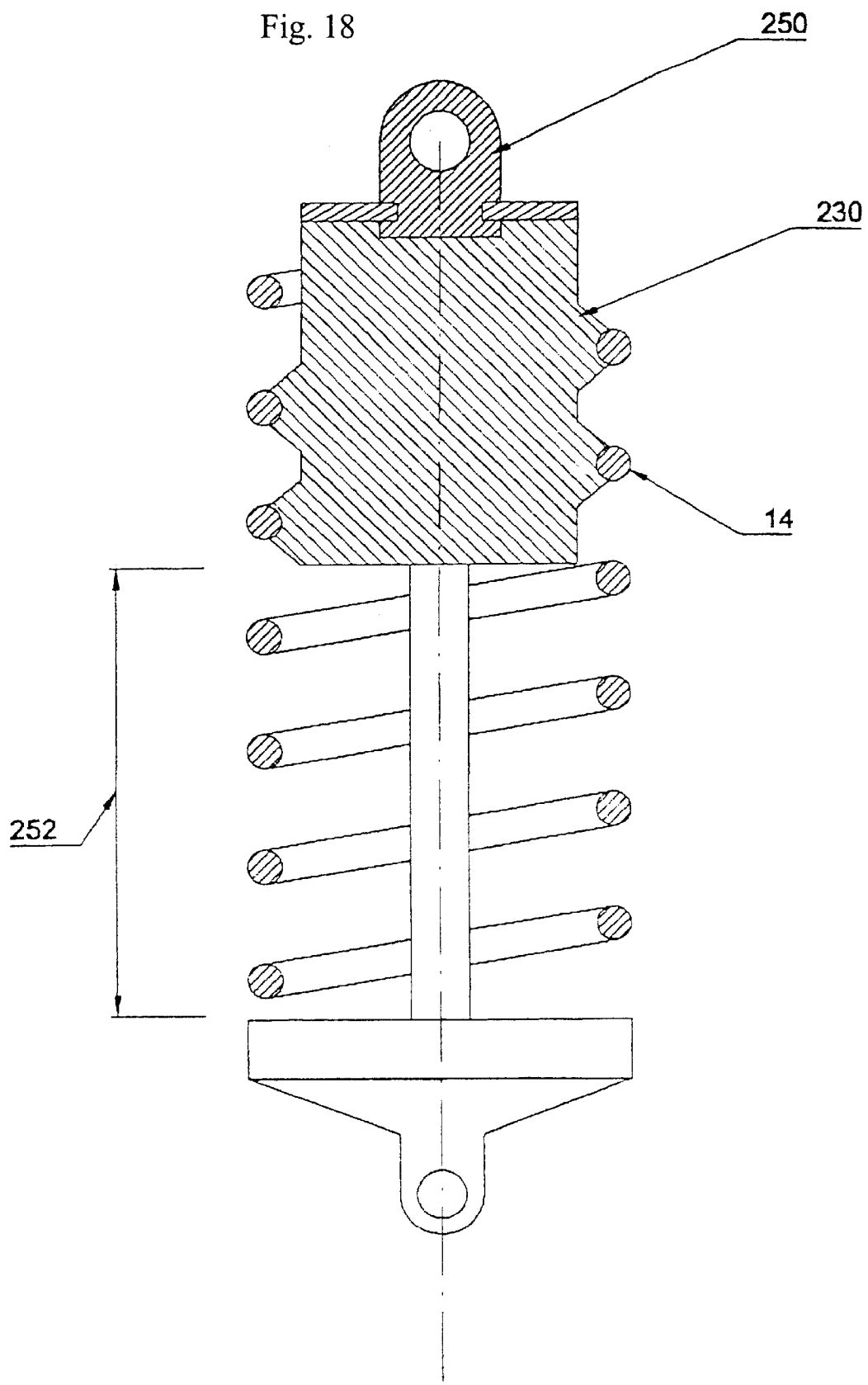
Figure 19:
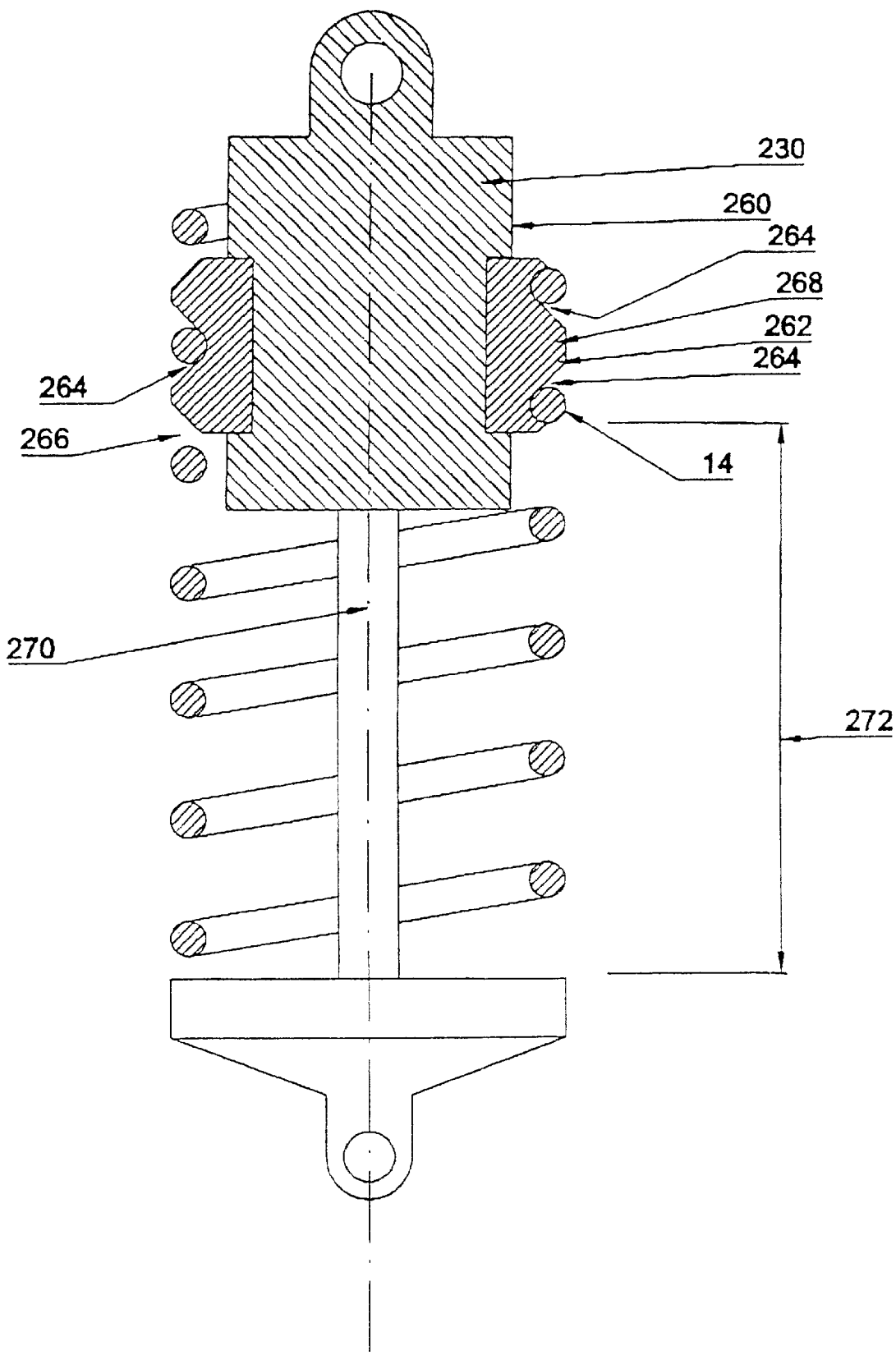
Figure 20:
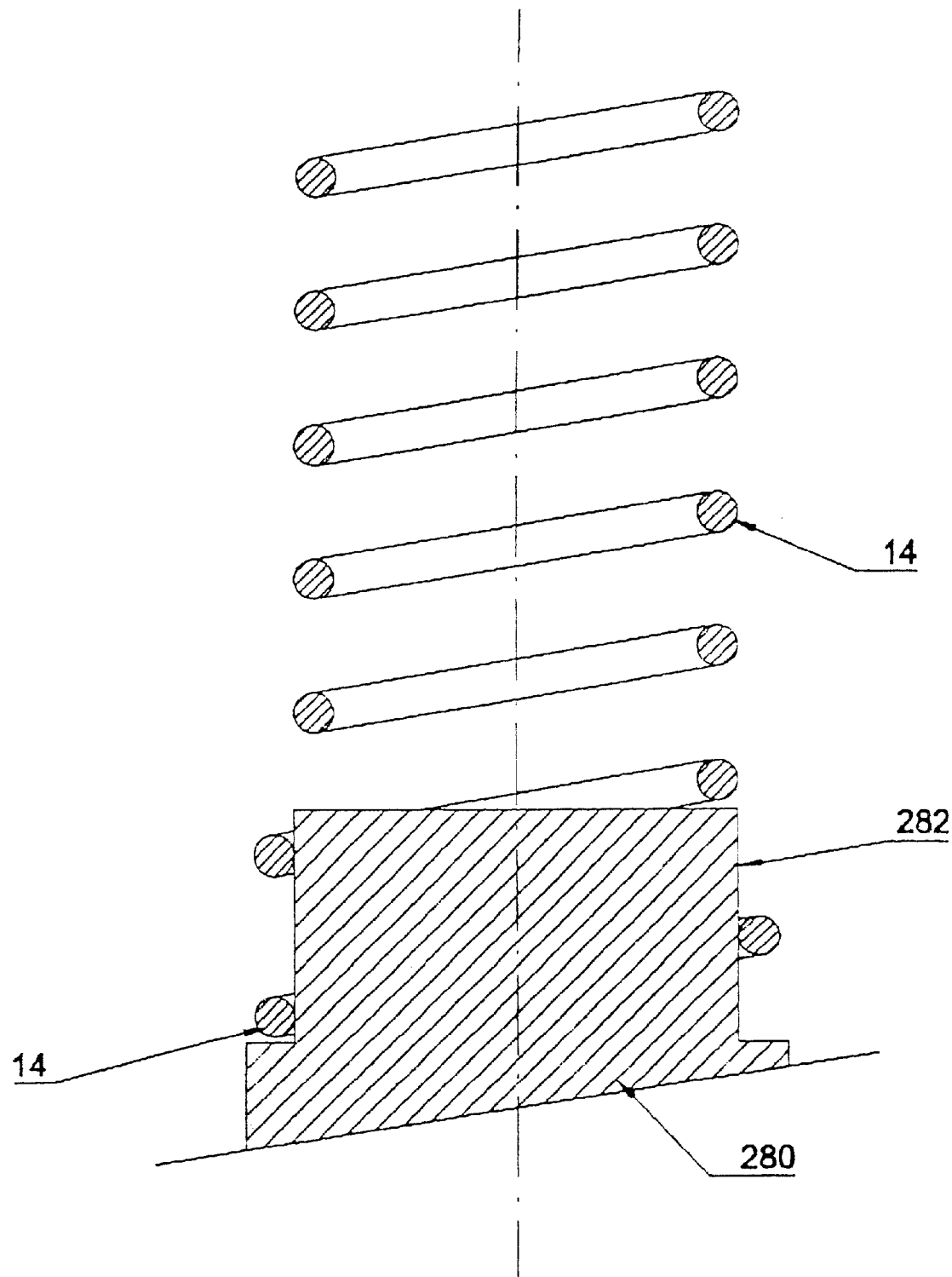
Figure 21:
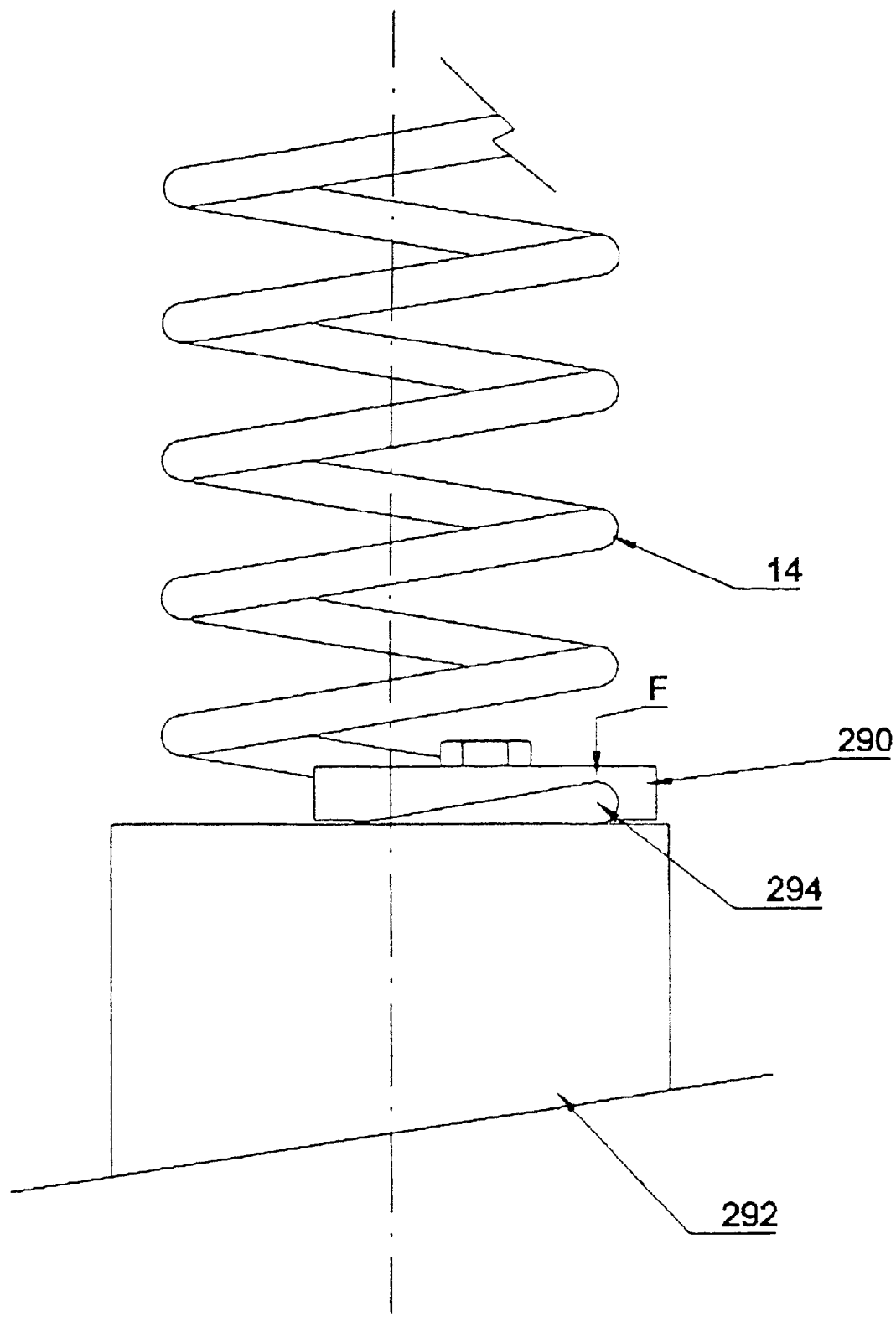
Figure 24:
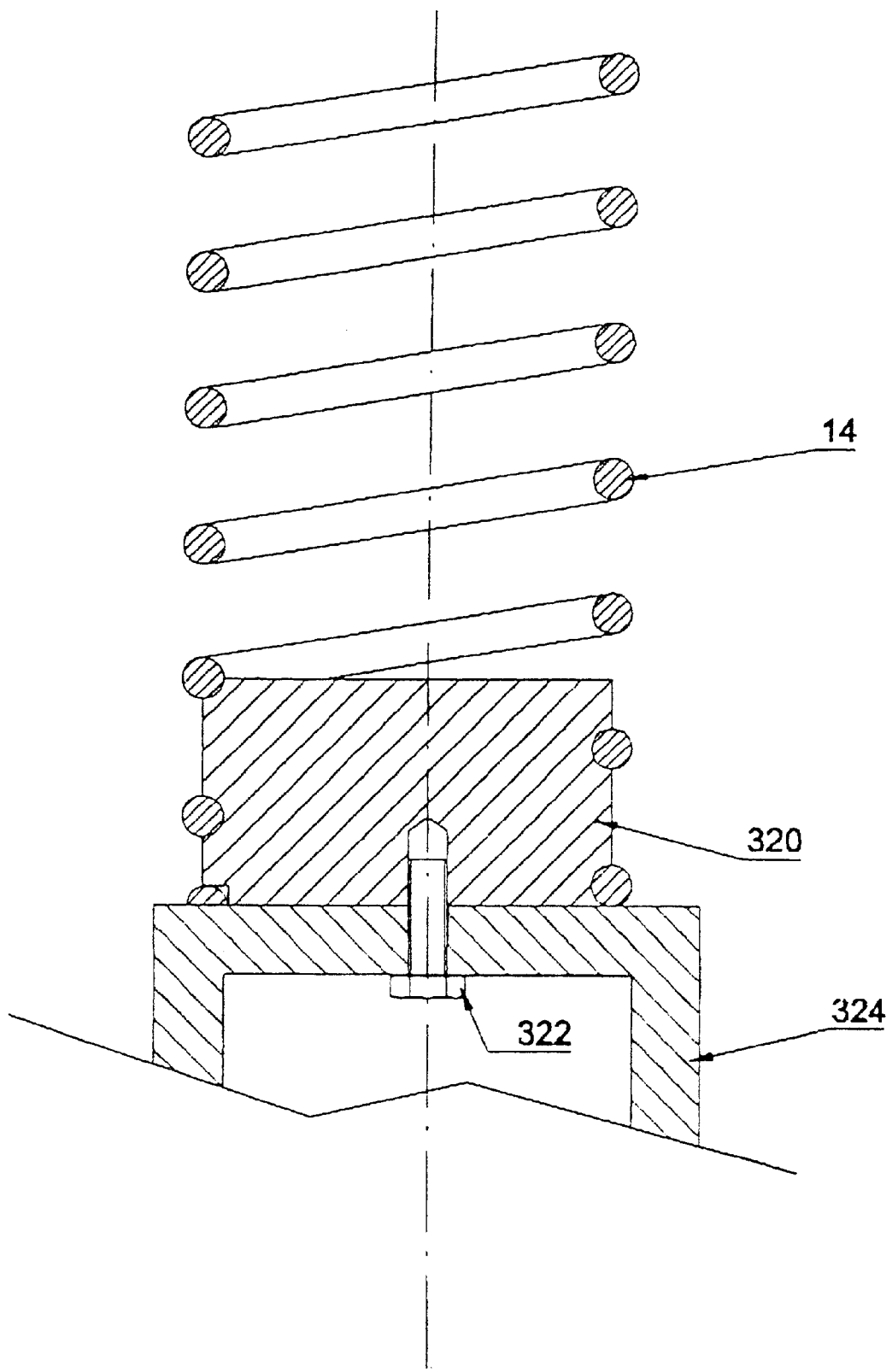

In the following, the invention will be described in detail by means of exemplary, non-restrictive embodiments in adjunction with the accompanying drawings, which show:

FIG. 1 a first exemplary embodiment of the invention in partial view;

FIG. 2 a second exemplary embodiment of the invention in partial view;

FIG. 3 a third exemplary embodiment of the invention in partial view;

FIG. 4 a fourth exemplary embodiment of the invention in partial view;

FIG. 5 a fifth exemplary embodiment of the invention in partial view;

FIG. 6 a sixth exemplary embodiment of the invention in partial view;

FIG. 7a a seventh exemplary embodiment of the invention in partial plan view;

FIG. 7b a seventh exemplary embodiment of the invention in partial elevational view;

FIG. 8a an eighth exemplary embodiment of the invention in partial plan view;

FIG. 8b an eighth exemplary embodiment of the invention in partial elevational view;

FIG. 9a a ninth exemplary embodiment of the invention in partial plan view;

FIG. 9b a ninth exemplary embodiment of the invention in partial elevational view;

FIG. 10a a tenth exemplary embodiment of the invention in partial plan view;

FIG. 10b a tenth exemplary embodiment of the invention in partial elevational view;

FIG. 11 an eleventh exemplary embodiment of the invention in partial view;

FIG. 12 a twelfth exemplary embodiment of the invention in partial view;

FIG. 13a a thirteenth exemplary embodiment of the invention in partial elevational view;

FIG. 13b a thirteenth exemplary embodiment of the invention in partial plan view;

FIG. 14a a fourteenth exemplary embodiment of the invention in partial elevational view;

FIG. 14b a fourteenth exemplary embodiment of the invention in partial plan view;

FIG. 15 a fifteenth exemplary embodiment of the invention in partial view;

FIG. 16 a sixteenth exemplary embodiment of the invention in partial view;

FIG. 17 a seventeenth exemplary embodiment of the invention in partial view;

FIG. 18 an eighteenth exemplary embodiment of the invention in partial view;

FIG. 19 a nineteenth exemplary embodiment of the invention in partial view;

FIG. 20 a twentieth exemplary embodiment of the invention in partial view;

FIG. 21 a twenty-first exemplary embodiment of the invention in partial view;

FIG. 22 a twenty-second exemplary embodiment of the invention in partial view;

FIG. 23 a twenty-third exemplary embodiment of the invention in partial view;

FIG. 24 a twenty-fourth exemplary embodiment of the invention in partial view;

FIG. 1 shows a first exemplary embodiment of the present invention in a schematic representation.

The fixed shock absorber 10 which is, for example, configured as a cartridge in a bicycle fork or as an independent shock absorber, comprises a shock absorber cover 12 having a thread about its periphery into which spring 14 engages, whereby said shock absorber 10, respectively absorber cover 12, is movably fixed relative to spring 14. Shock absorber 10 is preferably fixed at a (not shown) position relative to an embracing member. End 16 of spring 14 is fixed in a rotocap 18. Rotocap 18 is mounted rotatably about axis 20. Upon rotating cap 18, spring 14 turns so that the thread pitch of spring 14 displaces axially relative to the thread. For example when shock absorber cover 12 including thread is displaced upwardly as a consequence of a rotation of rotocap 18 by the spring 14 about the distance 22, the effective spring length, which corresponds to the spacing between rotocap 18 and absorber head 12, decreases from the dimension 24 to the dimension 26.

FIG. 2 shows a second exemplary embodiment of the present invention. A bicycle seat tube 30 comprises a sleeve 32 in its lower section having a female thread 34. A spring 14 is screwed into said female thread 34. On its downwardly directed end 36, spring 14 is braced against base 38 of fork cross bar 40. Fork cross bar 40 is arranged axially displaceable relative to seat tube 30. A rotation of seat tube 30 induces same to migrate relative to spring 14 with its thread 34 in direction of arrow 42, so that the distance between base 38 of fork cross bar 40 and the lower end 44 of seat tube 30 shortens or lengthens, respectively. The effective spring length changes upon change in distance 46.

This mechanism may be utilized, for example, in a so-called upside-down fork.

Seat tube 30 may also represent, for example, a cylinder rod of a bicycle rear wheel shock absorber for rear wheel shock absorption.

It should be noted that—especially with rear wheel shock absorption—for adjustment purposes, instead of seat tube 30, respectively said cylinder rod, the spring may also be rotated as well.

FIG. 3 shows a third exemplary embodiment of the invention in schematic representation.

The arrangement 50 represented in FIG. 3 is disposed in, for example, the fork cross bar or end cap of a bicycle, respectively. Setting knob 52 which is, for example, a setting knob on a fork or the body of a shock absorber or an absorber cartridge disposed in a fork, comprises a shaft 54 having a thread 56 about its periphery. Spring 14 engages into said thread 56. The farther that said shaft 54 is screwed into spring 14, the shorter the effective spring length becomes. In the corresponding inversion, the effective spring length enlarges when shaft 54 is screwed out of spring 14.

FIG. 4 shows a fourth exemplary embodiment of the present invention.

An O-ring 60 is braced against setting knob 52 which corresponds for example, with regard to its function and configuration, to the setting knob as represented in FIG. 3. The setting knob, respectively adjusting means, is locked by means of frictional contact connection, as existing here between said setting knob 52 and said O-ring 60.

FIG. 5 shows a fifth exemplary embodiment of the present invention in schematic representation.

The locking means here is configured in the form of a ball catch aligned in axial direction to setting knob 52 or respectively the (not shown) spring 14. The ball catch effecting load on ball 74, comprises a spring 72 engaging in a recess 70 of setting knob 74. Said ball 74 engages in a recess 76; a plurality of same being disposed on the periphery of element 78. Upon rotation of setting knob 52, said ball 74 migrates between said recesses 76. Upon said ball 74 engaging into recess 76 the force necessary for turning the setting knob is distinctly increased, so that the knob is in an essentially locked position.

FIG. 6 shows a sixth exemplary embodiment of the present invention.

FIG. 6 also represents, in particular, a ball catch, hence a locking means, based on the form-fit principle, in which the ball catch is aligned perpendicular to the axis of setting knob 52 or, respectively, to the (not shown) spring 14.

Spring 72 engages into recess 70 of element 78, and effects load upon ball 74 such that the latter is then pushed toward recesses 76 disposed on the periphery of setting knob 52.

FIG. 7 shows a seventh exemplary embodiment of the present invention in schematic representation.

In particular, a setting knob 52 is represented comprising a section 80 which is arranged axially displaceable and non-rotatable relative to the remaining area of the setting knob or, respectively, a shaft 82 including thread. Said section 80 comprises a segment 84 which is not rotationally symmetrical, and which is, preferably out-of-true. Said segment 84 has, for example, a hexagonal cross-section. In a first (not illustrated) axial position of setting knob 52, said segment 84 engages in a recess 86, the cross-section of which fundamentally represents a negative profile of segment 84. Hereby, the setting or rotating knob 52 is deprived of its mobility in rotational direction, so that the rotational movement of said shaft 82, non-rotatably connected to setting knob 52, is likewise inhibited, fixing the position of the (not shown) load transmission section on spring 14.

In a second axial position illustrated in FIG. 7, the rotational mobility of setting or rotating knob 52 is not obstructed, so that upon a corresponding rotation, a load transmission section of spring 14 (not shown), for example, may be axially displaced.

FIG. 8 shows an eighth exemplary embodiment in a schematic representation.

FIG. 8, in particular, illustrates a locking means based on the form-fit principle. Rotating or setting knob 52 is rotatably arranged relative to a fixed reference system. This rotational maneuverability may be transferred to a fixed position at which the location of a load transmission section is fixed at the spring device (which is not shown).

This is realized by bringing an element non-rotatably connected with the fixed reference system into a form-fit connection with setting knob 52. For example, flap 90, non-rotatably connected to the fixed reference system, is hinged about pivot point 92 in the slot-shaped recess 94 of setting Knob 52.

Only one slot-shaped recess 94 is represented in setting knob 52 in FIG. 8. Several or, respectively, star-shaped recesses may also be provided so that the number of angle positions for fixing the setting knob may be increased.

FIG. 9 shows a ninth exemplary embodiment of the present invention in a schematic partially sectional view.

Setting or rotating knob 52 comprises an elastic or flexible element 100 having a projection 102. In order to receive the projection 102, element 78 comprises recess 104, in which said flexible element 100 may engage for locking. Said flexible element 100 and/or setting or rotating knob 52 may be made, for example, of synthetic material.

FIG. 10 shows a tenth exemplary embodiment of the invention in a schematic partially sectional view.

FIG. 10 in particular represents a locking means. A spring-loaded pin 110 is received in recess 112 in element 78 and extends into bore 114 disposed on rotating knob 52. Counterpressure on pin 110 against the spring tension results in a release from the locked position.

FIG. 11 shows an eleventh exemplary embodiment of the present invention in a schematic representation.

Adjusting means 120, respectively load transmission means 122, comprises shackles 126 rotatably mounted via an articulation 124. In a first locked position, said shackles 126 engage into the interspaces 128 of the spring coils of spring 14. Hereby, axial displaceability between the load transmission means 122 and the spring 14 is fundamentally blocked.

In a second position, said shackles 126 are hinged in the direction of arrows 130, so that they are arranged radially internally or inside of the coils of spring 14. In this second position, an axial displacement between the load transmission means 122 and the spring 14 is possible.

Pawl catches, respectively shackles 126, are connected with control rod 134 via tension springs 132 as well as via articulation 124. When the control rod is urged in the direction of arrow 136, the pawl catches, respectively shackles 126, move radially inwardly about articulation 124, so as to allow for a displacement of the load transmission means in relation to spring 14.

In order to displace the load transmission means 122, control rod 134 is displaced together with sleeve 140 in the direction of arrow 136 or in the direction of arrow 142. After reaching the desired position in the axial direction of spring 14, the control rod 134 is displaced relative to sleeve 140 in the direction of arrow 142, so that the pawl catches, respectively tongues or shackles 126, move outwardly about articulation 124, and thus engage again into the interspaces 128 of the spring coils of spring 14.

FIG. 12 shows a twelfth exemplary embodiment of the invention in schematic view.

An angular element 150 is joined to control rod 134. Said angular element is further rotatably mounted relative to sleeve 140 via articulation 152.

When control rod 134 is drawn through sleeve 140 in the direction of arrow 136, said angular element 150 rotates inwardly in the direction of arrow 154, so that the unit consisting of sleeve 140 and control rod 134 may be displaced in the direction of arrow 136 or in the direction of arrow 156. When the desired axial position is reached, control rod 134 is pressed in the direction of arrow 156 relative to sleeve 140, so that angular element 150 retracts in the direction of arrow 158 and positions itself again into an interspace 128 of the spring coils of spring 14, so that the load transmission means, respectively adjusting means, is fundamentally fixed in axial direction relative to spring 14.

FIG. 13 shows a thirteenth exemplary embodiment of the invention in a schematic partially sectional view.

Control rod 170 is displaceably arranged inside hollow component 172. Said control rod 170, as well as said hollow component 172, respectively taper to wedge-shaped end sections 174, 176. At said tapered end section, the hollow component is provided with slots 178, 180, 182 and 184. Beginning at a determined point, upon the control rod being introduced into end 176, it pushes end section 176 outwardly, so that projections 186,188, arranged in the end section 176, are urged into interspaces 190,192 between the coils of spring 14. In this position, hollow component 172 is fundamentally fixed in axial direction relative to spring 14, so that a movement between spring 14 and hollow component 172 is essentially prevented. Preferably, camshaft 170 is fixed in this position relative to hollow component, so that neither is a relative movement possible here.

It is also preferred that camshaft 170, hollow component 172 respectively, comprises axial guides which prevent the rotational maneuverability of components 170,172.

It is particularly preferred that hollow component 172 has a female thread and that camshaft 170 has a male thread, so that said camshaft is helically rotatable within the hollow component—and thus also in axial direction—in order enable a change in adjustment. For purposes of fixing at a certain position, locking mechanisms as described above, for example, may be employed as rotating knobs.

When the relative position of the load transmission means, respectively projections 186,188, is changed in axial direction relative to the coils of spring 14, camshaft 170 is moved relative to hollow component 172 in the direction of arrow 194, so that the individual end segments of slotted end section 176 snap back towards the central axis 196, and thus projections 186,188 slip out of the interspaces of the coils of spring 14. In this position, the camshaft can be displaced together with the hollow component in axial direction relative to spring 14, prior to camshaft 170 being moved again into the desired axial position in the direction of arrow 198 relative to the hollow component 172, so that projections 176,180 position again in said interspaces 190,192 of the coils of spring 14, and thus block axial movement between hollow component 172 and spring 14.

It is particularly preferred that the surfaces of projections 186,188 are aligned outwardly radially atop one another and are, for example, of conical configuration.

FIG. 14 shows a fourteenth exemplary embodiment of the present invention in a schematic representation.

A rotating member 212 is mounted inside camshaft 210. Said rotating member 212 comprises a shackle 214 aligned radially outwardly in a first rotational position, thereby engaging in an interspace 216 of the coils of spring 14, and thus blocking an axial movement of camshaft 210, respectively rotating member 212, in axial direction relative to the coils of spring 14.

In a second rotational position (indicated as example here by dashed lines 218 and 220), shackle 214 is fundamentally turned inwardly, so that it moves out from the interspaces 216 of the coils of spring 14, and a relative mobility in axial direction between the load transmission means 222, camshaft 210 respectively, and the coils of spring 14, spring 14, respectively, is not impeded. In this situation, the camshaft may be displaced in axial direction (indicated by double-headed arrow 224). In a desired relative position between the camshaft 210, load transmission means 222 respectively, and the spring 14, the coils of spring 14 respectively, the rotating member may again be turned outwardly, so that the shackle 214 again engages in interspace 216 of the coils of spring 14, thus blocking axial movement between load transmission section 222, camshaft 210 respectively, and the coils of spring 14, spring 14 respectively.

FIG. 15 shows a fifteenth exemplary embodiment of the invention in schematic representation.

The outer section 232 of shock absorber 230 is rotated into spring 14, respectively into the coils of spring 14. One end 236 of spring 14 is fixed on the rotating member, handwheel 234 respectively. Upon a turning of handwheel 234, the relative axial position between the shock absorber 230 and the spring 14 shifts, so that the effective spring length 238, the free spring length 238, respectively, changes.

Cylinder rod 240 is preferably solidly connected to handwheel 234.

FIG. 16 shows a sixteenth exemplary embodiment of the invention in schematic representation.

Rotating member 242 is rotatably mounted relative cylinder rod 244, and receives spring 14 in the thread disposed on its external casing 246. A turning of rotating member 242 changes the effective spring length 248.

FIG. 17 shows, with shock absorber 230, a seventeenth exemplary embodiment of the invention and represents an exemplary alternative to the embodiment according to FIG. 15.

In this embodiment, spring 14 is rotated in order to adjust the position of a load transmission section.

FIG. 18 shows an eighteenth exemplary embodiment of the present invention in schematic representation.

Shock absorber 230 is rotatably mounted relative to connector 250, and engages from the inside into spring 14. Upon rotation of shock absorber 230 relative to connector 250 as well as to spring 14, the effective spring length 22 may be adjusted.

FIG. 19 shows a nineteenth exemplary embodiment of the present invention in schematic representation.

Rotating member 262 is rotatably arranged on the outer surface 260 of shock absorber 230 and which engages via recesses 264 into the coils of spring 14. Projections 268 of rotating member 262 engage in the coil interspaces 286.

Upon pivoting of rotating member 262 about the central axis 270, the effective spring length 272 may be adjusted or a current adjustment may be changed.

FIG. 20 shows a twentieth exemplary embodiment of the invention in schematic representation.

This representation illustrates a rotary lock for a spring 14 which is, for example, mounted on an embracing member 280. The spring 14 encloses a circular area, or respectively the end section 282 of embracing part 280, and is thereby extended so that static friction increases at the contact surfaces between spring 14 and end section 282 of embracing part 280, thus preventing the end section of spring 14 from rotating relative to embracing part 280.

FIG. 21 shows a twenty-first exemplary embodiment of the invention in a schematic representation.

A cap 290 is screwed onto embracing part 292 as a rotary lock. One end 294 of spring 14 is clamped between said cap 290 and said embracing part 292.

FIG. 22 shows a twenty-second exemplary embodiment of the present invention.

Spring 14 is disposed with a half-eye 300 on its end which is screwed to embracing part 302, so that spring 14 is secured against rotation relative to embracing part 302.

FIG. 23 shows a twenty-third exemplary embodiment of the present invention in schematic representation.

An eye 310, arranged in the end section of spring 14, engages into a slot 312 of embracing member 314, and is fixed there by means of a screw 316, so that spring 14 is secured against rotation relative to embracing part 314.

FIG. 24 shows a twenty-fourth exemplary embodiment of the present invention in schematic representation.

The end section of spring 14 is screwed onto block 320. Said block 320 is connected with embracing member 324 by means of screw 322, so that spring 14 is clamped via a splining effect.

It should be noted that in the embodiments described—in particular those described with respect to the figures—in order to avoid, for example, utilizing a rotating knob, the seat tube or the down tube of a bicycle fork, for example, may be rotated. When utilizing an external shock absorber, the spring seat or the absorber body, for example, may be rotated in order to adjust the effective spring length.

It is also preferred, in order to change adjustment, that a rotating knob rotates the spring or the corresponding companion part by means of a worm gear unit, whereby its self-locking trait acts positively upon the soundness of the adjustment.

It is also preferred that a rotating, or setting knob respectively, is secured via releasable freewheel, which, for example, is released in the direction of a lengthening of the effective spring deflection.

What is claimed is:

1. Spring device
   having at least one spring (14), within which external forces are introduced from at least two embracing members, wherein said forces are introduced at a load transmission section on the surface of said spring (14); and
   at least one load transmission means (10; 12) in contact with said spring (14) for transmitting the external forces to said load transmission section, wherein said load transmission means comprise a shock absorber (10) and a shock absorber cover (12) fixedly attached to said sock absorber 10, wherein said shock absorber cover (12) is adapted to engage said load transmission section of said spring (14);
   said spring device further comprising adjusting means (18; 52) for adjusting an axial position of said load transmission section on said spring surface, wherein said load transmission section which engages said shock absorber cover (12) has a fixed length independent of said axial position thereof.

2. Spring device according to claim 1, characterized in that said adjusting means (18; 52) are effective to adjust an effective spring length of said spring at a fundamentally constant spring tension.

3. Spring device according to claim 1, characterized in that said adjusting means (18; 52) render an infinitely variable adjustment of the axial position of a load transmission section or of said spacing of said load transmission section.

4. Spring device according to claim 1, characterized in that said spring (14) is a coil spring.

5. Spring device according to claim 4, characterized in that the coils of said coil spring span a fundamentally helical region, whereby said load transmission means (10; 12) or said adjusting means (18; 52) extend at least partially within said helical region.

6. Spring device according to claim 5, characterized in that said load transmission means (10; 12) or said adjusting means (18; 52) extend from said spring (14) into the interior of the helical region spanned by said spring coils, whereby said load transmission means (10; 12) or said adjusting means (18; 52) comprise areas within said helical region at which said load transmission means (10; 12) or said adjusting means (18; 52) are adapted to he coupled with the coils of said spring (14), whereby the location in spring axial direction or the type of these coupling points between said spring (14) and said load transmission means (10; 12) or said adjusting means (18; 52) are variably adjustable by said adjusting means (18; 52).

7. Spring device according to claim 1, characterized in that the coils of said spring (14) span a fundamentally helical section, whereby said load transmission means (10; 12) or said adjusting means (18; 52) at least partially externally enclose coils of said spring (14) radially;
said radial external section is coupled with said spring coils; and
the position of said coupling sections between said spring coils and said load transmission means (10; 12) or said adjusting means (18; 52) is adjustable in the direction of a spring axis (20).

8. Spring device according to claim 1, characterized in that a radial inner section within said spring, or a portion of said load transmission means (10; 12) situated radially external of said spring, or said adjusting means (18; 52) comprise at least one section extending into at least one coil interspace (128) through which a force can be at least partially introduced to said spring.

9. Spring device according to claim 1, characterized in that the section of said load transmission means (10; 12) radially situated within said spring coils and/or the section of same situated radially external of said spring coils and/or said adjusting means (18; 52) comprises projections and recesses; said recesses for receiving coil sections of spring (14) for transmission of force such that said component with the provided projections and recesses is at least partially mechanically isolated via the spring (14) from at least one second component which is coupled with the spring and arranged at least partially displaceable relative to said first component.

10. Spring device according to claim 7, characterized in that a portion of said adjusting means (18; 52), or said load transmission means (10; 12) situated radially external of said coils, or a portion thereof situated radially within said coils is provided with a thread having thread recesses for receiving the spring coils, so that via a screwed-type of connection between said spring coils and said adjusting means (18; 52), or said load transmission means (10; 12), an external force is introduced at said spring device by a first component which is at least partially mechanically isolated via the spring (14) from at least one second component which is coupled with the spring and arranged least partially displaceable relative to said first component.

11. Spring device according to claim 1, characterized in that at least a part of said adjusting means (18; 52) is moved at least occasionally along a three-dimensional path during adjustment of the position of said load transmission section on said spring surface.

12. Spring device according to claim 1, characterized in that at least a part of said adjusting means (18; 52) is moved at least occasionally along a two-dimensional path during adjustment of the position of said load transmission section on said spring surface.

13. Spring device according to claim 1, characterized in that a locking means is provided for locking a predetermined relative position between said load transmission means and said spring (14) or said adjusting mean (18; 52) and said spring (14).

14. Spring device according to claim 13, characterized in that said locking means comprises at least one spring-loaded snap element.

15. Spring device according to claim 1, characterized in that at least one rotary lock mechanism is provided through which said spring (14) is coupled with an embracing member in a force-applying flow section.

16. Spring device according to claim 1, characterized in that a compensating mechanism is provided which maintains a constant spacing between two points of reference at different adjustment positions of said adjusting means (18; 52) so that the forces introduced into the spring device at different spring adjustments have at least two non-variable, with regard to their relative position, points of contact external the spring (14).

17. Spring device according to claim 1, characterized in that said shock absorber (10) is at least partially encompassed by said load transmission means or said adjusting means (18; 52).

18. Spring device according to claim 1, wherein said shock absorber is an elastomer shock absorber.

19. Spring device according to claim 13, wherein said locking means fixes the position of at least one of said load transmission sections relative to said spring surface.

* * * * *

UNITED STATES PATENT AND TRADEMARK OFFICE
CERTIFICATE OF CORRECTION

PATENT NO.   : 6,471,197 B1
DATED        : October 29, 2002
INVENTOR(S)  : Peter Denk et al.

It is certified that error appears in the above-identified patent and that said Letters Patent is hereby corrected as shown below:

Column 1,
Line 17, please delete "over vibration", and insert therefor -- overvibration --.

Column 4,
Line 32, after "area", please insert -- of --.

Column 11,
Line 19, after "order", please insert -- to --.

Column 12,
Line 26, please delete "22", and insert therefor -- 252 --.
Line 33, please delete "286", and insert therefor -- 266 --.

Column 13,
Line 27, please delete "(10)", and insert therefor -- 10 --.
Line 27, please delete "(12)", and insert therefor -- 12 --.
Line 29, please delete "(12)", and insert therefor -- 12 --.
Line 35, please delete "(12)", and insert therefor -- 12 --.
Line 59, please delete "he", and insert therefor -- be --.

Column 14,
Line 2, after "enclose", please insert -- the --.
Line 39, after "arranged", please insert -- at --.
Line 54, please delete "mean", and insert therefor -- means --.

Signed and Sealed this

First Day of April, 2003

JAMES E. ROGAN
*Director of the United States Patent and Trademark Office*